(12) United States Patent
Tomonaga et al.

(10) Patent No.: US 8,937,962 B2
(45) Date of Patent: Jan. 20, 2015

(54) PACKET BUFFERING DEVICE AND PACKET DISCARDING METHOD

(75) Inventors: Hiroshi Tomonaga, Kawasaki (JP); Kazuto Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 70 days.

(21) Appl. No.: 13/195,109

(22) Filed: Aug. 1, 2011

(65) Prior Publication Data
US 2011/0286468 A1 Nov. 24, 2011

Related U.S. Application Data

(63) Continuation of application No. PCT/JP2009/052110, filed on Feb. 6, 2009.

(51) Int. Cl.
| | |
|---|---|
| *H04L 12/801* | (2013.01) |
| *H04L 12/853* | (2013.01) |
| *H04L 12/841* | (2013.01) |
| *H04L 12/835* | (2013.01) |
| *H04L 12/823* | (2013.01) |
| *H04L 29/06* | (2006.01) |

(52) U.S. Cl.
CPC ............ *H04L 47/10* (2013.01); *H04L 47/2416* (2013.01); *H04L 47/28* (2013.01); *H04L 47/30* (2013.01); *H04L 47/32* (2013.01); *H04L 65/80* (2013.01)
USPC ............ 370/412; 370/414; 370/428; 370/429

(58) Field of Classification Search
None
See application file for complete search history.

(56) References Cited

U.S. PATENT DOCUMENTS

| | | | | | |
|---|---|---|---|---|---|
| 5,042,029 | A | * | 8/1991 | Hayakawa | 370/231 |
| 5,623,490 | A | * | 4/1997 | Richter et al. | 370/263 |
| 5,926,458 | A | * | 7/1999 | Yin | 370/230 |
| 5,928,327 | A | * | 7/1999 | Wang et al. | 725/88 |
| 6,064,676 | A | * | 5/2000 | Slattery et al. | 370/412 |
| 6,075,791 | A | * | 6/2000 | Chiussi et al. | 370/412 |
| 6,094,692 | A | * | 7/2000 | Kalkunte | 710/34 |
| 6,292,490 | B1 | * | 9/2001 | Gratacap et al. | 370/412 |
| 6,477,143 | B1 | * | 11/2002 | Ginossar | 370/230 |
| 6,504,824 | B1 | * | 1/2003 | Tanaka et al. | 370/252 |
| 6,597,662 | B1 | * | 7/2003 | Kumar et al. | 370/236 |
| 6,690,645 | B1 | * | 2/2004 | Aweya et al. | 370/230 |
| 6,701,389 | B2 | * | 3/2004 | Gorti et al. | 710/29 |

(Continued)

FOREIGN PATENT DOCUMENTS

| | | |
|---|---|---|
| JP | 9-18510 | 1/1997 |
| JP | 2004-532566 | 10/2004 |

(Continued)

OTHER PUBLICATIONS

Japanese Office Action issued Aug. 9, 2011 in corresponding Japanese Patent Application 2010-549323.

(Continued)

*Primary Examiner* — Ian N Moore
*Assistant Examiner* — Lakeram Jangbahadur
(74) *Attorney, Agent, or Firm* — Staas & Halsey LLP

(57) ABSTRACT

A packet buffering device includes: a queue for temporarily holding an arriving packet; a residence time predicting unit which predicts a length of time during which the arriving packet will reside in the queue; and a packet discarding unit which discards the arriving packet when the length of time predicted by the residence time predicting unit exceeds a first reference value.

11 Claims, 24 Drawing Sheets

(56) References Cited

U.S. PATENT DOCUMENTS

| | | | |
|---|---|---|---|
| 6,704,312 B1* | 3/2004 | Chang et al. | 370/389 |
| 6,738,386 B1* | 5/2004 | Holmqvist | 370/412 |
| 6,741,603 B2* | 5/2004 | Pate et al. | 370/412 |
| 6,757,255 B1* | 6/2004 | Aoki et al. | 370/252 |
| 6,768,717 B1* | 7/2004 | Reynolds et al. | 370/230.1 |
| 6,862,621 B2* | 3/2005 | Takada et al. | 709/224 |
| 6,865,185 B1* | 3/2005 | Patel et al. | 370/412 |
| 6,885,666 B1* | 4/2005 | Chow et al. | 370/392 |
| 6,977,895 B1* | 12/2005 | Shi et al. | 370/235 |
| 6,996,117 B2* | 2/2006 | Lee et al. | 370/429 |
| 7,009,937 B2* | 3/2006 | Miyamoto | 370/229 |
| 7,069,356 B2* | 6/2006 | Meyer et al. | 710/52 |
| 7,145,914 B2* | 12/2006 | Olarig et al. | 370/413 |
| 7,177,274 B2* | 2/2007 | Van Der Zee et al. | 370/230 |
| 7,203,170 B2* | 4/2007 | Dooley | 370/235 |
| 7,230,952 B2* | 6/2007 | Beshai | 370/412 |
| 7,324,521 B2* | 1/2008 | Kohzuki et al. | 370/395.4 |
| 7,369,498 B1* | 5/2008 | Ma et al. | 370/235 |
| 7,372,865 B2* | 5/2008 | Scott et al. | 370/429 |
| 7,376,141 B2* | 5/2008 | Rosengard et al. | 370/412 |
| 7,392,279 B1* | 6/2008 | Chandran et al. | 709/200 |
| 7,453,800 B2* | 11/2008 | Takajitsuko et al. | 370/230 |
| 7,613,114 B2* | 11/2009 | Iwata et al. | 370/235 |
| 7,626,993 B2* | 12/2009 | Kyusojin | 370/412 |
| 7,646,715 B2* | 1/2010 | Oueslati et al. | 370/234 |
| 7,660,252 B1* | 2/2010 | Huang et al. | 370/235 |
| 7,746,881 B2* | 6/2010 | Wildfeuer et al. | 370/412 |
| 7,756,133 B2* | 7/2010 | Glaser | 370/394 |
| 8,122,242 B2* | 2/2012 | Elliott | 713/154 |
| 2002/0018474 A1* | 2/2002 | Assa et al. | 370/395.71 |
| 2004/0111541 A1* | 6/2004 | Meyer et al. | 710/52 |
| 2004/0114516 A1* | 6/2004 | Iwata et al. | 370/230.1 |
| 2006/0098584 A1* | 5/2006 | Kyusojin | 370/252 |
| 2006/0146708 A1* | 7/2006 | Kanazawa | 370/232 |
| 2006/0251091 A1* | 11/2006 | Terauchi | 370/412 |
| 2008/0049618 A1* | 2/2008 | Ishii et al. | 370/235 |
| 2010/0027567 A1* | 2/2010 | Teramoto | 370/516 |
| 2011/0051604 A1* | 3/2011 | Nishimura | 370/235 |
| 2011/0286468 A1* | 11/2011 | Tomonaga et al. | 370/412 |

FOREIGN PATENT DOCUMENTS

| | | |
|---|---|---|
| JP | 2005-27199 | 1/2005 |
| JP | 2005-348166 | 12/2005 |
| JP | 2008-53851 | 3/2008 |
| WO | 02/082747 A2 | 10/2002 |
| WO | 2005/020524 A1 | 3/2005 |
| WO | 2008/144902 | 12/2008 |

OTHER PUBLICATIONS

Japanese Office Action issued Jul. 3, 2012 in corresponding Japanese Patent Application No. 2010/549323.

B. Braden et al., "Recommendations on Queue Management and Congestion Avoidance in the Internet", RFC2309, IETF, Apr. 1998, pp. 1-13.

Kazumi Kumazoe et al., "Improving Delay Characteristics of Real-Time Flows by Adaptive Early Packet Discarding", ICOIN 2006, LNCS 3961, 2006, pp. 463-472.

International Search Report for PCT/JP2009/052110, Mailed Mar. 17, 2009.

* cited by examiner

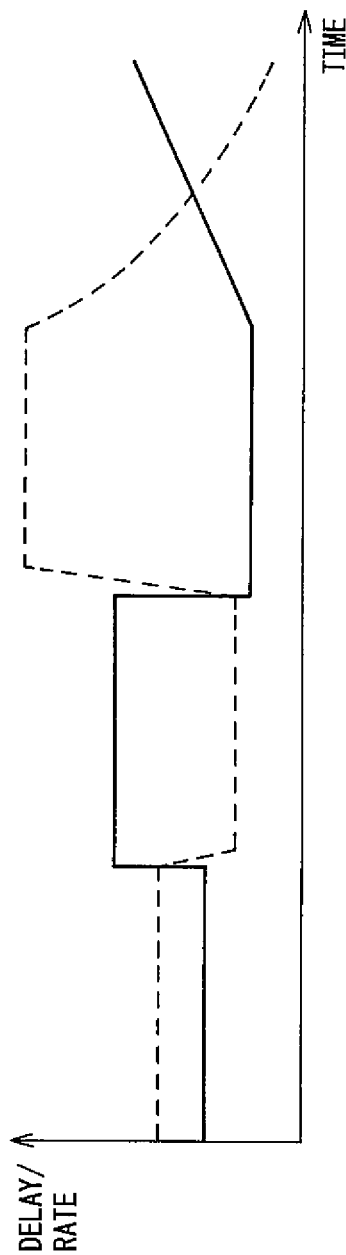

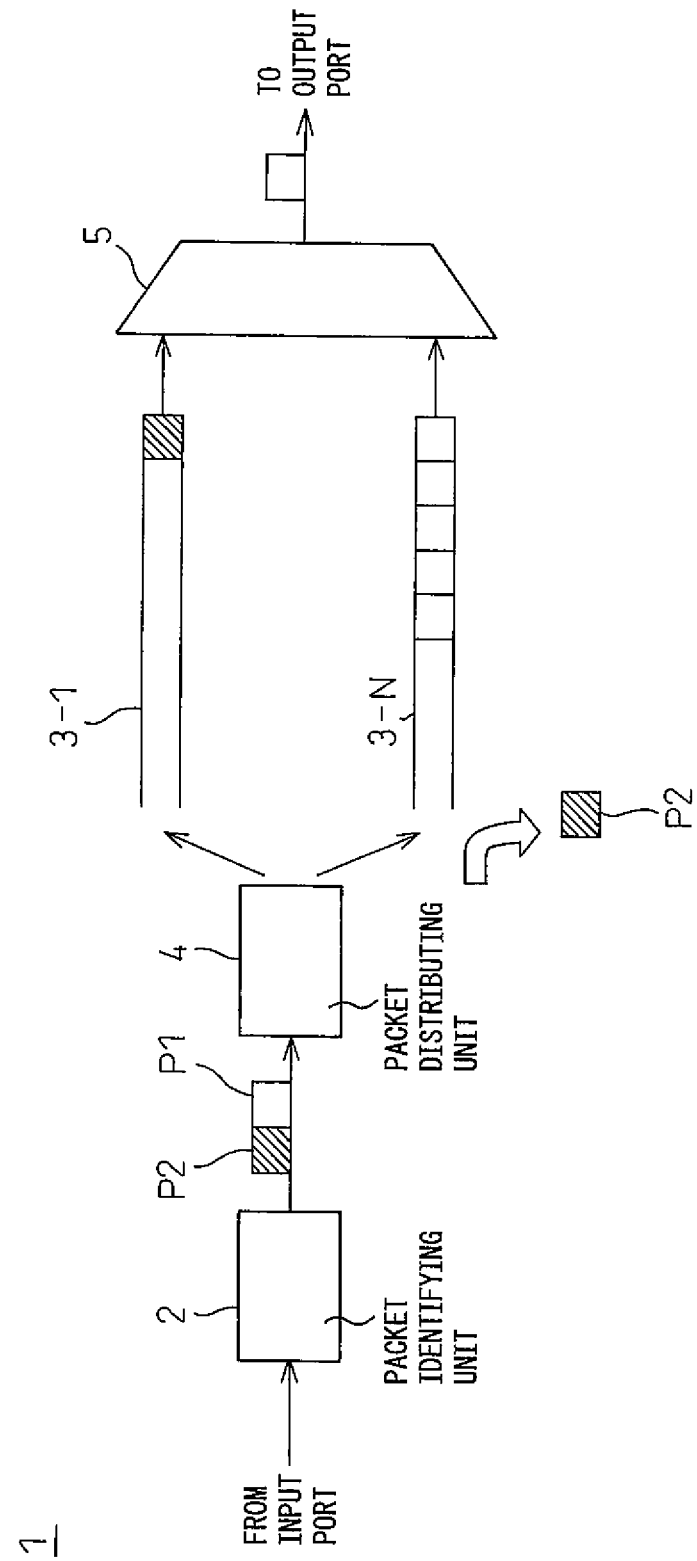

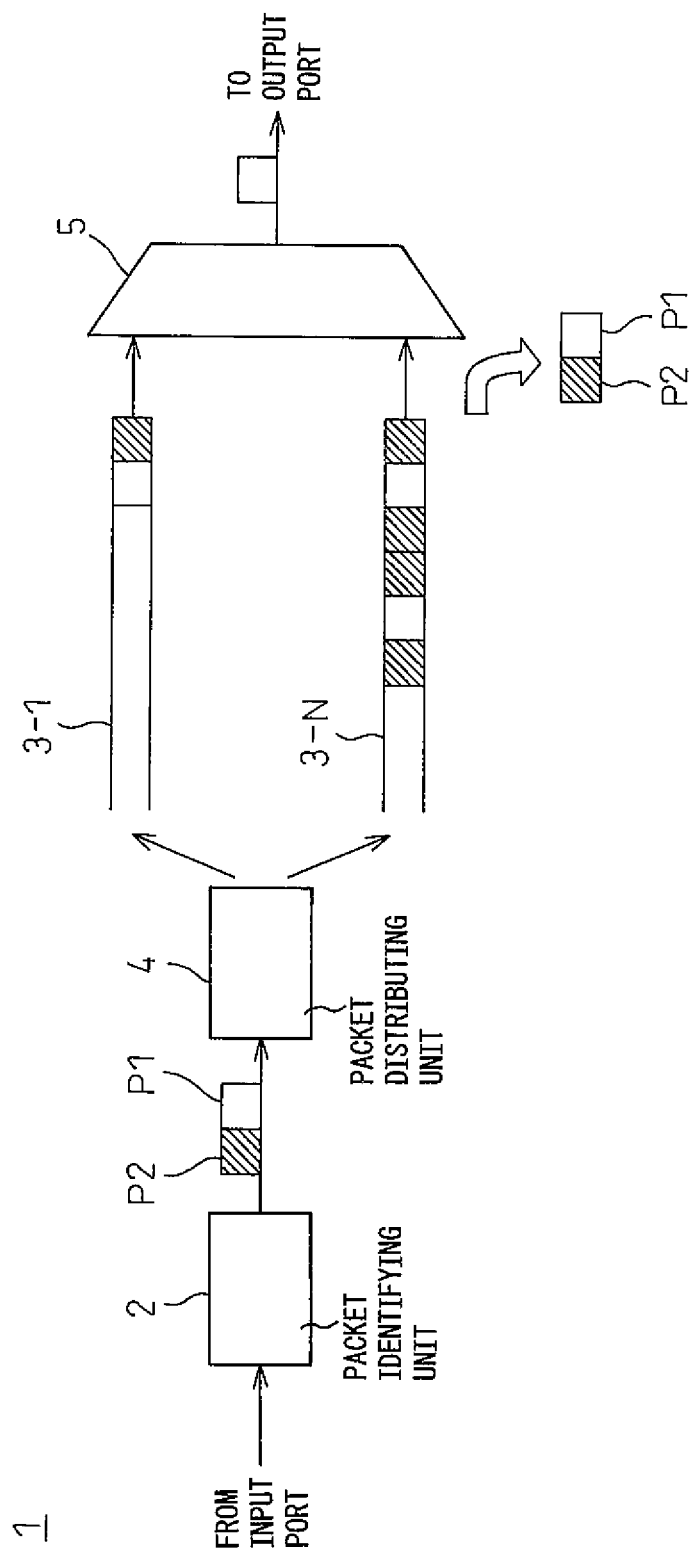

PACKET BUFFERING DEVICE AND PACKET DISCARDING METHOD

CROSS-REFERENCE TO RELATED APPLICATIONS

The present application is a continuation application based on International application No. PCT/JP2009/052110, filed on Feb. 6, 2009.

FIELD

The embodiments discussed herein are related to a packet discarding method for use in a packet buffering device which temporarily holds arriving packets.

BACKGROUND

With the proliferation of the Internet in recent years, the move to implement various WEB servers and various kinds of services, such as electronic mail, IP telephony, and moving image transfer has been proceeding rapidly. With this trend, the importance of Quality of Service (QoS) control at network node devices that support the Internet has been increasing.

In the case of the services expected to be provided by next-generation networks, etc., the quality of service is guaranteed in principle by providing a sufficient data transmission bandwidth to the network. On the other hand, in the case of the services provided by WEB servers, including services such as IP telephony and moving image transfer, a sufficient data transmission bandwidth is not necessarily guaranteed because such services are provided on the existing Internet.

In the prior art, Tail Drop and Random Early Detection (RED) are proposed as methods for discarding data in the event of packet buffer congestion. An edge node device is also proposed that performs RED by varying the packet discard rate according to the packet residence time. Further, a data flow amount control device is disclosed that calculates the length of time during which a packet to be transmitted from a base station to a mobile station is expected to be held in a buffer at the base station. There is also disclosed a data transmission method that reads from data to be transferred the time at which the data needs to arrive at the destination, and that discards the data packet if it is determined that the data will not arrive at the destination by the requested arrival time.

Related art is disclosed in B. Braden, D. Clark, J. Crowcroft, "Recommendations on Queue Management and Congestion Avoidance in the Internet", RFC2309, IETF, April 1998, and Japanese Laid-open Patent Publications No. 2005-348166, No. 2008-53851 and No. 9-18510.

SUMMARY

According to one embodiment, there is provided a packet buffering device which includes: a queue for temporarily holding an arriving packet; a residence time predicting unit which predicts a length of time during which the arriving packet will reside in the queue; and a packet discarding unit which discards the arriving packet when the length of time predicted by the residence time predicting unit exceeds a first reference value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1 is a graph illustrating the relationship between output rate variation and delay variation;

FIG. 2 is a diagram illustrating a first example of residence time-based packet discard control;

FIG. 3 is a diagram illustrating a second example of residence time-based packet discard control;

DESCRIPTION OF EMBODIMENTS

Figure 4A:
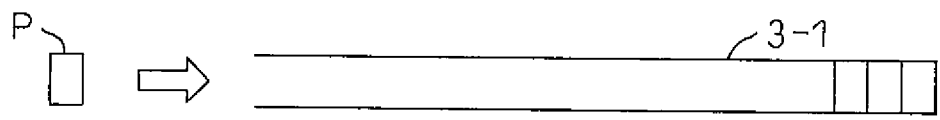
FIG. 4A is a diagram (part 1) illustrating the delay variation that occurs in connection with the residence time-based packet discard control.

Preferred embodiments will be described below with reference to the accompanying drawings. As earlier described, Tail Drop and RED are known methods for discarding data when a packet buffering device is congested. In Tail Drop, the packet buffering device determines whether the amount of data stored in its internal queue exceeds a certain specified value. If the amount of data stored in the queue exceeds the specified value, the packet buffering device does not store the subsequently arriving packets in the queue but discards them. In the following description, the amount of data stored in the queue may be referred to as the "queue length." The technical relationship between the queue and the input and/or output packet buffer will be described later.

RED is a congestion control technique implemented by utilizing the TCP control mechanism that lowers the packet transmission rate at the packet source when a packet discard occurs. The packet buffering device discards packets at a certain discard rate at an early point in time when congestion is about to occur. By so doing, the occurrence of congestion is indicated to the packet source, thereby resolving the congestion before the congestion becomes high. That is, by randomly discarding flows at a given discard rate, the packet buffering device lowers all the flow rates in the queue simultaneously, avoiding a situation in which the packet transfer throughput drops.

The Tail Drop and RED described above are packet discard control techniques based on the queue length. In the packet buffering device, it is general practice to perform QoS control by allocating priorities to the queues. The output rate of a lower priority queue changes in real time as a function of the amount of traffic entering a higher priority queue.

Since the residence time in each queue is defined by "Residence Time in Queue=Queue Length (Data Amount)/Output Rate", the delay variation depends on the output rate. FIG. 1 is a graph illustrating the relationship between output rate variation and delay variation. In FIG. 1, the solid line indicates the output rate variation, and the dashed line depicts the delay time. As illustrated, the delay, i.e., the residence time in the queue, increases as the output rate increases, and it is thus seen that the output rate variation causes the delay variation. In this way, the packet discard control techniques based on the queue length, such as the Tail Drop and RED described above, involve the problem that delay variation occurs due to the output rate variation that occurs at the time of congestion.

FIG. 2 is a diagram illustrating a first example of residence time-based packet discard control. Reference numeral 1 indicates a packet buffering device, and P1 and P2 indicate packets input to the packet buffering device 1. Reference numerals 3-1 to 3-N indicate N queues for temporarily holding the input packets, while reference numeral 2 designates a packet identifying unit, 4 a packet distributing unit, and 5 a scheduler. This packet buffering device is applicable for use in a packet transfer device for Layer 2 and Layer 3 packets.

The packet identifying unit 2 identifies whether the input packets P1 and P2 comply with the specification of input bandwidth prescribed for the source user, and classifies the packets into those that comply with the specification and those that do not. In the example of FIG. 2, the packet identifying unit 2 identifies the packet P1 indicated by a white rectangle as being a packet that complies with the specification, and identifies the packet P2 indicated by a hatched rectangle as being a packet that does not comply with the specification.

The packet distributing unit 4 distributes each input packet to one of the queues 3-1 to 3-N according to the input packet destination, user, application, etc. The scheduler 5 reads out the packets from the queues 3-1 to 3-N for output according to the predetermined priority and output bandwidth. In the packet discard control illustrated in FIG. 2, the residence time of the packets currently held in the queue is measured. If the measured residence time exceeds a reference value, the packet P2 that does not comply with the specification of input bandwidth is discarded. Such discard control will hereinafter be referred to as "Time Based Tail Drop."

Alternatively, a discard rate is determined that changes as a function of the measured residence time, and the packet P2 that does not comply with the specification of input bandwidth is discarded in accordance with the thus determined discard rate. Such discard control may hereinafter be called the "Time Based WRED." WRED is an acronym for Weighted Random Early Detection.

FIG. 3 is a diagram illustrating a second example of residence time-based packet discard control. The same component elements as those in FIG. 2 are designated by the same reference numerals. In the packet discard control illustrated in FIG. 3, the residence time of the packets currently held in the queue is measured, and any packets held in the queue for a time exceeding a reference value are discarded, starting from the packet at the head of the queue. Such discard control will hereinafter be referred to as "Time Based Head Drop."

In the Time Based Tail Drop and the Time Based WRED, the packet buffering device 1 performs the discard control based on the residence time. In this case, the packet buffering device 1 uses the residence time of the packet held at the head of the queue as the residence time based on which to perform the control. As a result, by the time the discard process starts with the residence time of the packet at the head exceeding the reference value, too many packets have already been stored in the queue. This has led to a situation where when the discard process is started, the residence time continues to increase until the queue empties and, when the queue becomes empty, the residence time abruptly decreases. How this occurs will be described with reference to FIG. 4A to FIG. 4E.

FIG. 4A to FIG. 4E are diagrams illustrating the delay variation that occurs in connection with the residence time-based packet discard control. In the state of FIG. 4A, the queue length of the queue 3-1 is on the increase because the packet input rate is larger than the output rate, but the residence time of the packet at the head of the queue has not yet reached the reference value THTD above which the packet discard is started.

Figure 4B:
FIG. 4B is a diagram (part 2) illustrating the delay variation that occurs in connection with the residence time-based packet discard control.

Next, in the state of FIG. 4B, the queue length of the queue 3-1 is longer than that in the state of FIG. 4A. As a result, in the state of FIG. 4B, the residence time in the queue 3-1 becomes longer than that in the state of FIG. 4A, and the packet delay time thus increases. This situation is depicted in FIG. 4E. Arrows A to D indicate the delay times in the states of FIG. 4A to FIG. 4D, respectively.

Figure 4C:
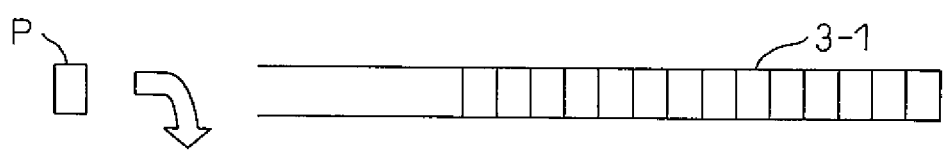
FIG. 4C is a diagram (part 3) illustrating the delay variation that occurs in connection with the residence time-based packet discard control.
Figure 4D:
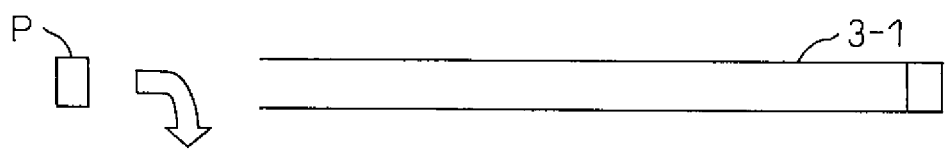
FIG. 4D is a diagram (part 4) illustrating the delay variation that occurs in connection with the residence time-based packet discard control.
Figure 4E:
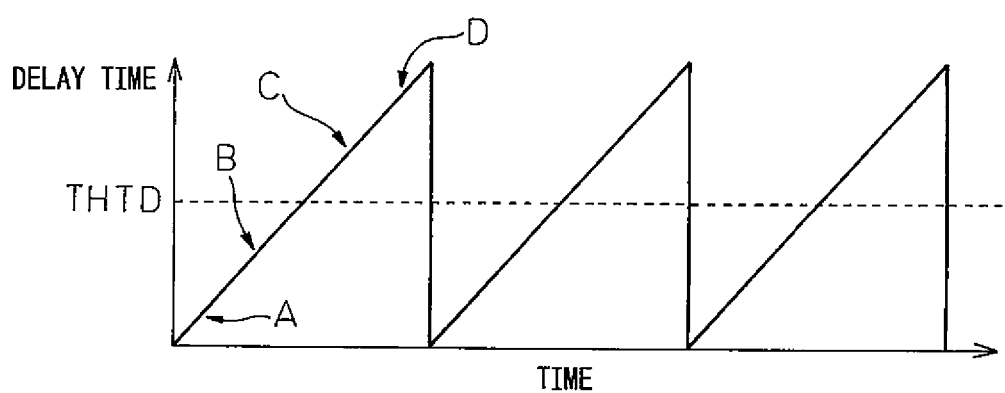
FIG. 4E is a diagram (part 5) illustrating the delay variation that occurs in connection with the residence time-based packet discard control.

When the state of FIG. 4C is reached, the packet buffering device 1 starts the Tail Drop or WRED because the residence time of the packet at the head of the queue 3-1 has exceeded the reference value THTD. As a result, no subsequent packets are input to the queue 3-1, but a large amount of packets have already been stored in the queue 3-1. As a result, the residence time of any packet reaching the head of the queue continues to increase until all the packets in the queue 3-1 are output. Then, when the state of FIG. 4D is reached, and the queue 3-1 becomes empty, the residence time falls back to "0", whereupon the queue resumes storing packets. Consequently, the delay time abruptly decreases. In this way, the Time Based Tail Drop and the Time Based WRED also have had the problem that delay variation occurs at the time of congestion.

Figure 5:
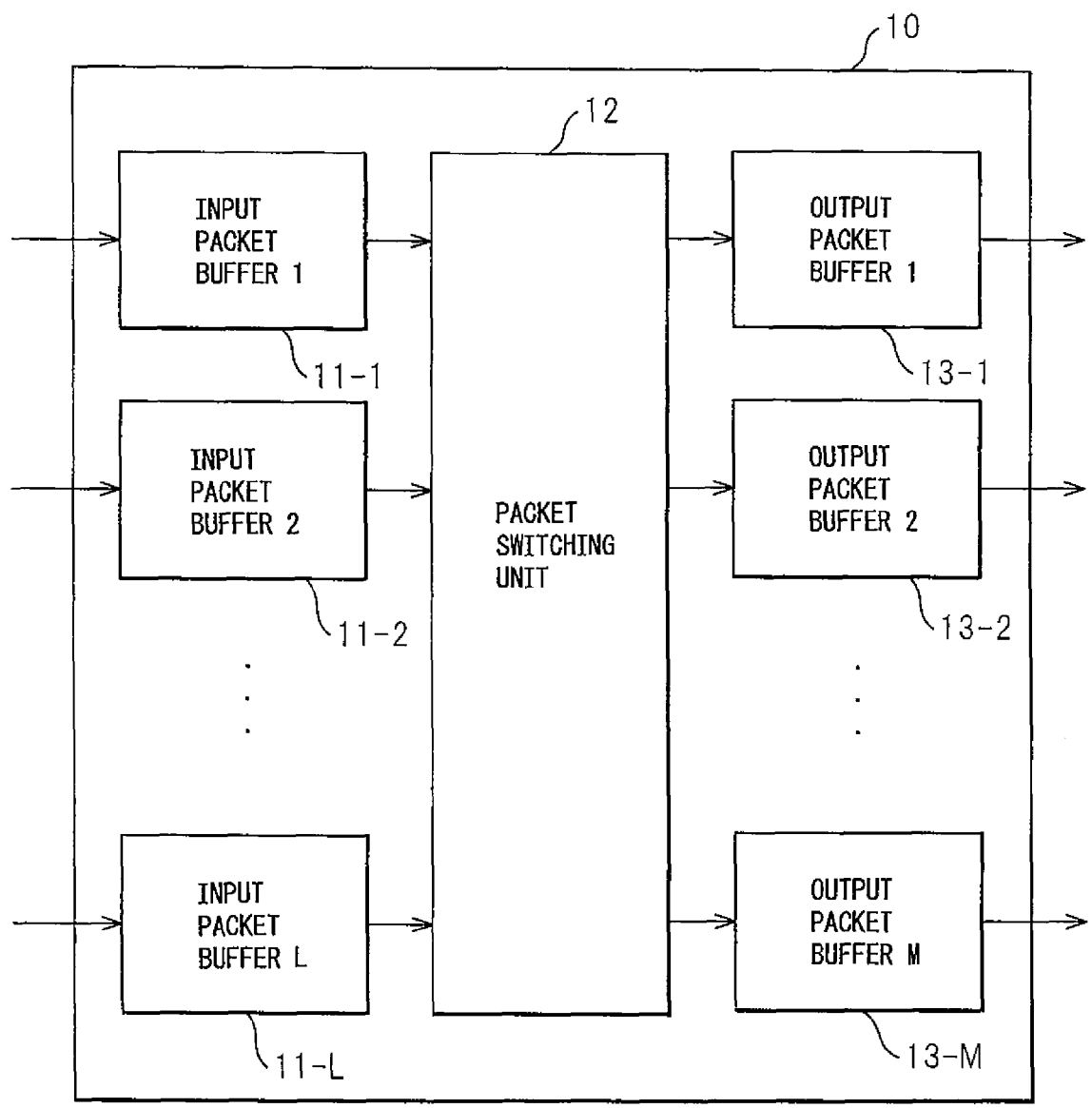
FIG. 5 is a diagram illustrating the general configuration of a switch.

FIG. 5 is a diagram illustrating the general configuration of a switch. The switch 10 is a device that directs a packet received via any one of a plurality of input ports to a designated one of a plurality of output ports. The switch 10 may be a Layer 2 switch or a Layer 3 switch. Reference numerals 11-1 to 11-L are input packet buffers, 12 is a packet switching unit, and 13-1 to 13-M are output packet buffers. The L input packet buffers 11-1 to 11-L temporarily hold the packets received via the respective input ports, and supply the packets to the packet switching unit 12 after scheduling them. The packet switching unit 12 identifies the output port for each input packet by referring to the address information attached to the packet, and directs the packet to the output packet buffer connected to the thus identified output port. The M output packet buffers 13-1 to 13-M temporarily hold the packets received from the packet switching unit 12, and output the packets via the respective output ports after scheduling them.

The packet switching unit 12 may include a packet buffer therein. The packet buffer in the packet switching unit 12 is used to temporarily hold packets, for example, on one of the lines from the input ports to the output ports of the packet switching unit 12. In an alternative embodiment, either the input packet buffers 11-1 to 11-L or the output packet buffers 13-1 to 13-M or both of them may be omitted, and the packet buffers may be incorporated in the packet switching unit 12.

Figure 6:
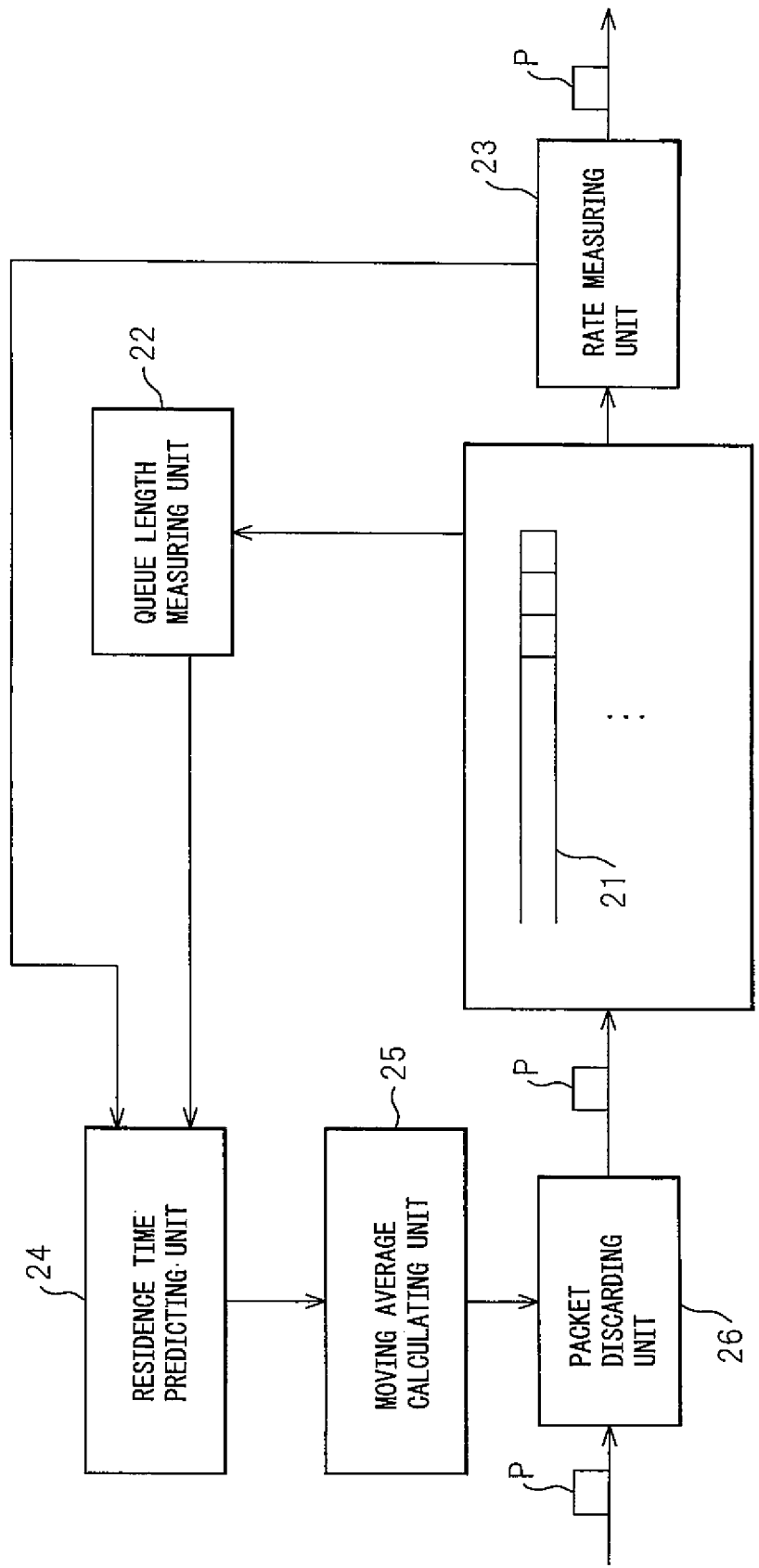
FIG. 6 is a diagram illustrating a first configuration example of an input packet buffer depicted in FIG. 5.

FIG. 6 is a diagram illustrating a first configuration example of the input packet buffer 11-1 depicted in FIG. 5. The other input packet buffers 11-2 to 11-L, the output packet buffers 13-1 to 13-M, and the packet buffers incorporated in the packet switching unit 12 may have substantially the same configuration as illustrated herein. This also applies to the second to seventh configuration examples of the input packet buffer 11-1 to be described later. Reference numeral 21 indicates a queue, 22 is a queue length measuring unit, 23 is a rate measuring unit, 24 is a residence time predicting unit, 25 is a moving average calculating unit, 26 is a packet discarding unit, and P designates a packet. The input packet buffer 11-1 thus includes the queue 21, the queue length measuring unit 22, the rate measuring unit 23, the residence time predicting unit 24, the moving average calculating unit 25, and the packet discarding unit 26.

The queue 21 is a queue for temporarily holding the packets input to the input packet buffer 11-1, and the input packets held therein are serviced on a first-in, first-out basis. The queue length measuring unit 22 measures the queue length LQ i.e., the amount of data held in the queue 21. Rather than sequentially outputting the measured queue length, the queue length measuring unit 22 may output its weighted moving average value as the measurement result. Using the weighted moving average value offers the advantage of being able to achieve stable control by eliminating the effects of an abrupt change that may occur in the queue length. The rate measuring unit 23 measures the output rate RO of the packets output from the queue 21.

By dividing the measured queue length LQ by the output rate RO, the residence time predicting unit 24 determines a predicted value TF which predicts how long the packet will reside in the queue 21 in the present situation. That is, the residence time predicting unit 24 calculates the predicted value by the equation (Predicted Value=Queue Length LQ/Output Rate RO). The moving average calculating unit 25 calculates the weighted moving average value TF of the residence time predicted value determined by the residence time predicting unit 24. The weighted moving average value of the residence time predicted value will hereinafter be referred to as the "average predicted value TF." Based on the average predicted value TF, the packet discarding unit 26 performs packet discarding before storing the arriving packets in the queue 21. Other methods for obtaining the average predicted value TF include an arithmetic average method, an exponentially weighted time average method, a least square method, etc. These methods may be applied to the moving average calculating unit 25.

Figure 7:
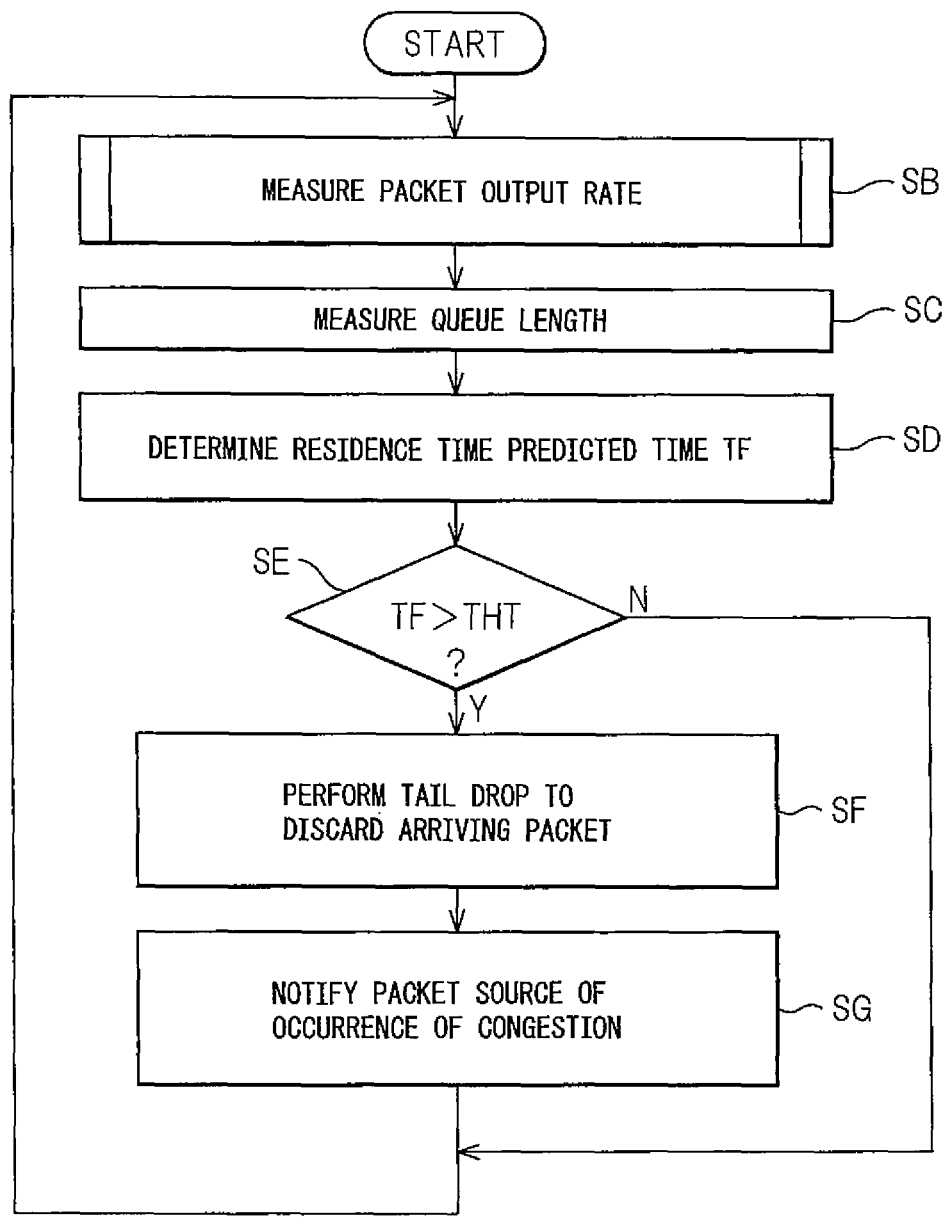
FIG. 7 is a diagram illustrating a first example of a packet discarding method.

FIG. 7 is a diagram illustrating a first example of a packet discarding method. In operation SB, the rate measuring unit 23 measures the output rate RO of the packets output from the queue 21. An example of the measurement of the output rate RO by the rate measuring unit 23 will be described later. In operation SC, the queue length measuring unit 22 measures the queue length LQ of the queue 21. In operation SD, the residence time predicting unit 24 calculates the predicted value by the equation (Predicted Value=Queue Length LQ/Output Rate RO). The moving average calculating unit 25 calculates the average predicted value TF of the residence time predicted by the residence time predicting unit 24.

In operation SE, the packet discarding unit 26 determines whether or not the average predicted value TF calculated by the moving average calculating unit 25 exceeds a predetermined maximum allowable residence time THT. If the average predicted value TF does not exceed the maximum allowable residence time THT (N in operation SE), the input packet buffer 11-1 returns the process to operation SB.

If the average predicted value TF exceeds the maximum allowable residence time THT (Y in operation SE), the packet discarding unit 26 transfers the process to operation SF. In operation SF, the packet discarding unit 26 does not store the arriving packet in the queue 21 but discards the packet. That is, the packet discarding unit 26 performs Tail Drop based on the predicted value of the packet residence time in the queue 21.

Further, in operation SG, the packet discarding unit 26 explicitly notifies the packet source that congestion has occurred in the switch 10. For example, the packet discarding unit 26 explicitly notifies the packet source of the occurrence of the congestion by utilizing the Explicit Congestion Notification mechanism in the TCP/IP protocol. After that, the input packet buffer 11-1 returns the process to operation SB. In an alternative embodiment, the above operations SB to SG may be implemented as steps.

According to the present embodiment, since the residence time of the packets residing in the queue 21 at the time of congestion becomes substantially equal to the maximum allowable residence time THT, the delay variation that occurs in the input packet buffer 11-1 can be reduced.

In TCP control, packet retransmission control is performed by measuring the retransmission timeout time. According to the present embodiment, since the delay variation in the input packet buffer provided on the transmission line is reduced, stable retransmission control can be achieved, which serves to enhance packet throughput.

The embodiment also serves to suppress the occurrence of a bursty discard situation in which once tail drop occurs, the packets continue to be discarded until the queue becomes empty, as earlier described with reference to FIG. 4A to FIG. 4E. It thus becomes possible to avoid a situation in which all the TPC flow rates drop simultaneously due to bursty packet discard.

Figure 8:
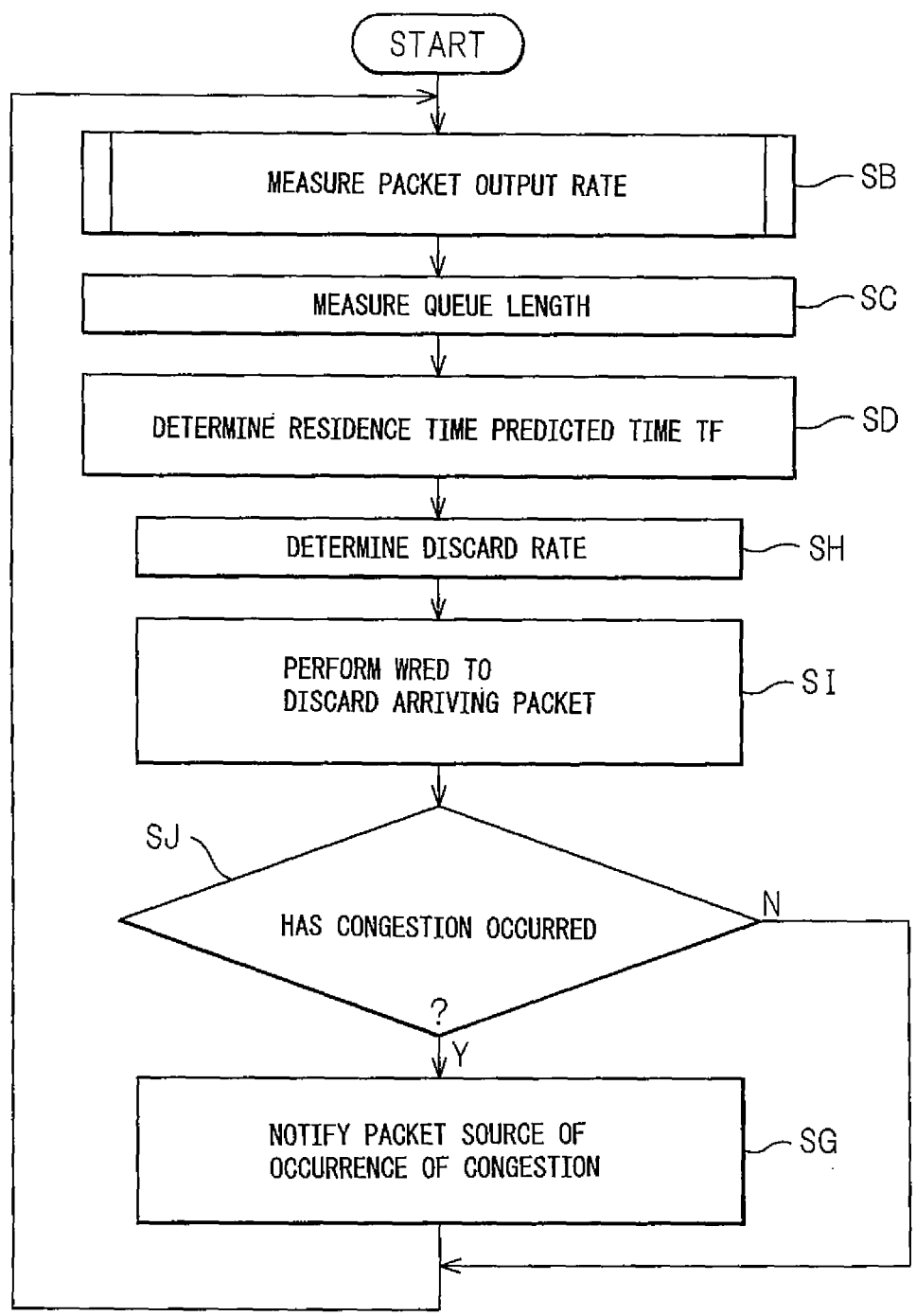
FIG. 8 is a diagram illustrating a second example of the packet discarding method.

FIG. 8 is a diagram illustrating a second example of the packet discarding method. In operations SB to SD, the average predicted value TF is determined in the same manner as in the operations SB to SD illustrated in FIG. 7. In operation SH, the packet discarding unit 26 determines the input packet discard rate in the following manner according to the average predicted value TF. The discard rate here refers to the ratio of the number of packets to be discarded by the packet discarding unit 26 to the total number of input packets per unit time.

Let a parameter MinTh define a threshold value for the predicted value of the residence time above which the input packets begin to be discarded (the discard start predicted value). Let a parameter MaxP define a maximum value of the input packet discard rate (the maximum discard rate). Let a parameter MaxTh define the residence time at which the discard rate becomes the maximum discard rate MaxP (the maximum discard predicted value).

When the average predicted value TF is not larger than MinTh, the packet discarding unit 26 sets the discard rate to 0 for the packets that can be transferred normally. That is, when TF≤MinTh, the input packets are not discarded. When the average predicted value TF is not smaller than MaxTh, the packet discarding unit 26 sets the discard rate to MaxP. When the average predicted value TF is larger than MinTh but smaller than MaxTh, the packet discarding unit 26 determines the discard rate in accordance with the equation (Discard Rate=MaxP×(Average Predicted Value TF−MinTh)/(MaxTh−MinTh)).

In operation SI, the packet discarding unit 26 discards the arriving packets in accordance with the discard rate determined in SH. That is, the packet discarding unit 26 performs WRED based on the predicted value of the packet residence time in the queue 21. In operation SJ, the packet discarding unit 26 determines whether congestion has occurred or not by checking whether the average predicted value TF is larger than MinTh or not. If it is determined by the packet discarding unit 26 that congestion has not occurred (N in operation SJ), the input packet buffer 11-1 returns the process to operation SB.

If it is determined that congestion has occurred (Y in operation SJ), then in operation SG the packet discarding unit 26 explicitly notifies the affected packet source that congestion has occurred in the switch 10. After that, the input packet buffer 11-1 returns the process to operation SB. In an alternative embodiment, the above operations SB to SJ may be implemented as steps.

According to the present embodiment, when congestion occurs, the packets begin to be discarded as the average predicted value TF exceeds the discard start predicted value MinTh, and the flow rate of the packets from the affected packet source is thus reduced. As a result, when it is predicted that the average predicted value TF is likely to become excessively large, no further packets are stored in the queue 21, and control is performed so as to bring the packet residence time closer to the set value determined in accordance with each of the above parameters. This serves to reduce the delay variation that occurs in the input packet buffer 11-1.

Figure 9:
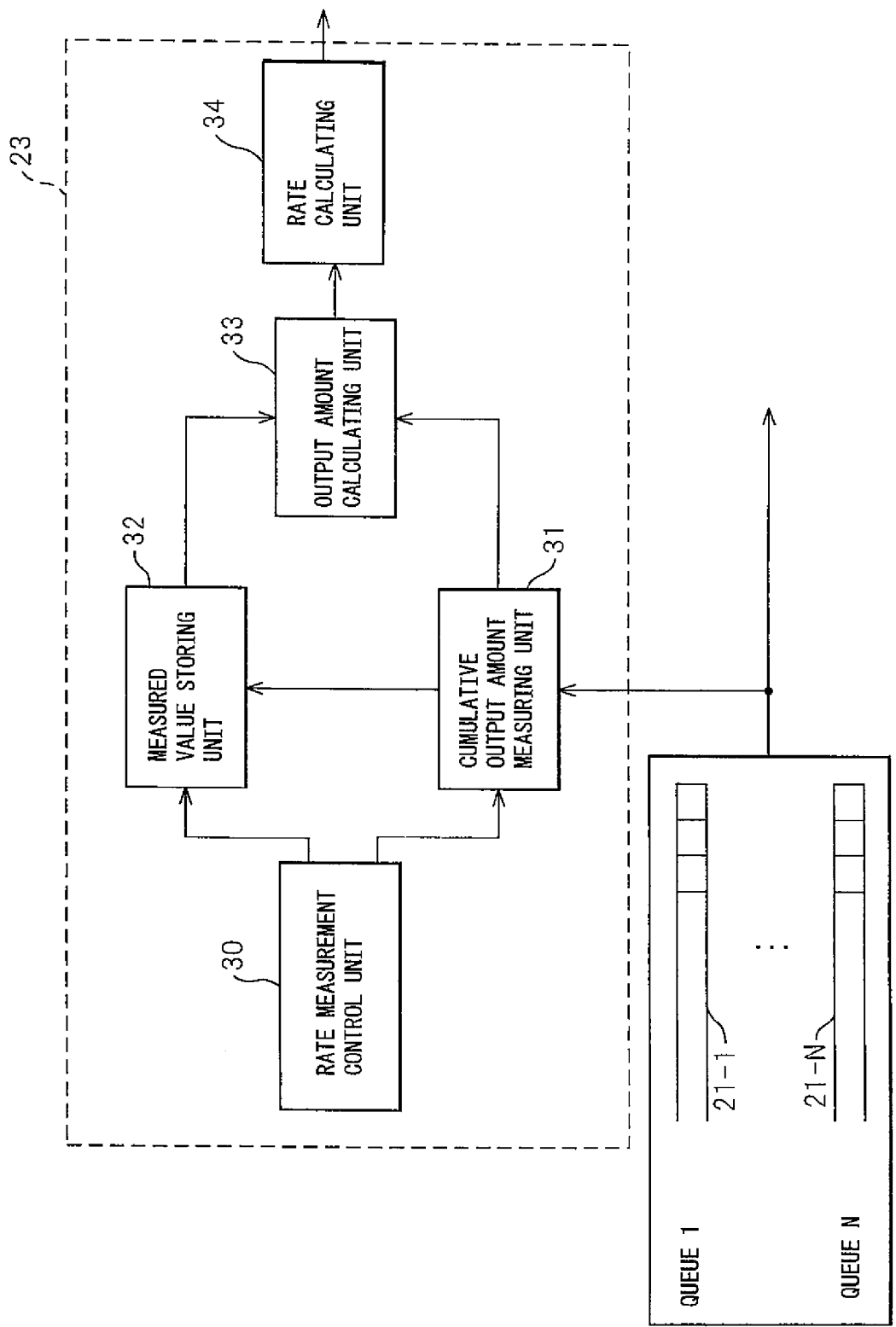
FIG. 9 is a diagram illustrating a first configuration example of a rate measuring unit depicted in FIG. 6.

FIG. 9 is a diagram illustrating a first configuration example of the rate measuring unit 23 depicted in FIG. 6. In this embodiment, the input packet buffer 11-1 includes N queues 21-1 to 21-N for temporarily holding the input packets. The queues 21-1 to 21-N are queues for temporarily holding the packets input to the input packet buffer 11-1, and the input packets classified by destination, user, application, etc. and held in the respective queues are serviced on a first-in, first-out basis. Reference numeral 30 is a rate measurement control unit, 31 is a cumulative output amount measuring unit, 32 is a measured value storing unit, 33 is an output amount calculating unit, and 34 is a rate calculating unit. The rate measuring unit 23 thus includes the rate measurement control unit 30, the cumulative output amount measuring unit 31, the measured value storing unit 32, the output amount calculating unit 33, and the rate calculating unit 34.

The rate measurement control unit 30 sequentially selects each of the N queues 21-1 to 21-N, periodically with a predetermined measurement period T0, as the queue whose packet output rate is to be measured. The rate measurement control unit 30 sends notification of the selected queue to the cumulative output amount measuring unit 31 and the measured value storing unit 32. The cumulative output amount measuring unit 31 counts the amount of data output from each of the queues 21-1 to 21-N and obtains the cumulative amount of output data. When the notification of the queue to be measured is received from the rate measurement control unit 30, the cumulative output data amount measured on that queue is reported to the measured value storing unit 32 and the output amount calculating unit 33.

The measured value storing unit 32 stores, for each of the queues 21-1 to 21-N, the cumulative output data amount measured by the cumulative output amount measuring unit 31. When the notification of the queue to be measured is received from the rate measurement control unit 30, the cumulative output data amount stored at the time of the previous measurement is reported to the output amount calculating unit 33. The output amount calculating unit 33 receives the currently measured cumulative output data amount from the cumulative output amount measuring unit 31, and receives the previously measured cumulative output data amount from the measured value storing unit 32. The output amount calculating unit 33 calculates the amount of data output from the selected queue during the period between the previous measurement and the current measurement (Output Data Amount=Currently Measured Cumulative Output Data Amount−Previously Measured Cumulative Output Data Amount). The output amount calculating unit 33 reports the thus calculated output data amount to the rate calculating unit 34.

The rate calculating unit 34 calculates, from the output data amount reported from the output amount calculating unit 33, the output rate RO of the packets output from the selected queue (RO=Output Data Amount/Measurement Period T0), and outputs the thus calculated output rate. Rather than outputting the successively calculated output rate RO, the rate calculating unit 34 may output the weighted moving average value of the output rate RO. Using the weighted moving average value offers the advantage of being able to achieve stable control by eliminating the effects of an abrupt change that may occur in the output rate. An average value other than the weighted moving average value may be obtained by using, for example, an arithmetic average method, an exponentially weighted time average method, or a least square method.

Figure 10:
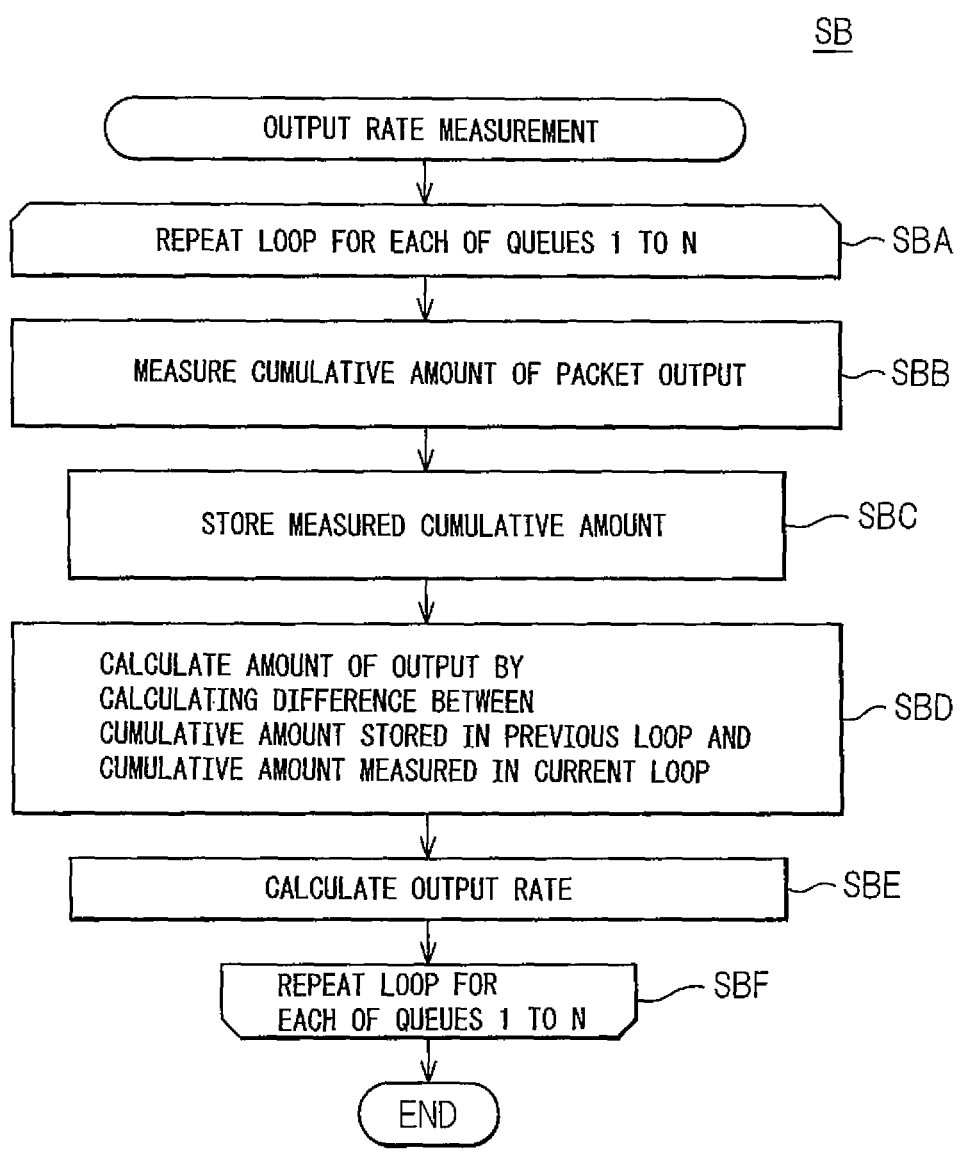
FIG. 10 is a diagram illustrating a first example of a rate measuring method.

FIG. 10 is a diagram illustrating a first example of a rate measuring method. The output rate in operation SB in FIG. 7 and FIG. 8 may be measured in accordance with the rate measuring method described hereinafter with reference to FIG. 10.

The rate measurement control unit 30 sequentially selects each of the N queues 21-1 to 21-N, periodically with the predetermined measurement period T0, as the queue whose packet output rate is to be measured. The cumulative output amount measuring unit 31, the measured value storing unit 32, the output amount calculating unit 33, and the rate calculating unit 34 calculate the packet output rate for each selected queue by repeatedly executing the loop of SBA to SBF.

The cumulative output amount measuring unit 31 counts the amount of data output from each of the queues 21-1 to 21-N and obtains the cumulative amount of output data. In operation SBB, the cumulative output amount measuring unit 31 reports the cumulative output data amount, measured on the selected queue, to the measured value storing unit 32 and the output amount calculating unit 33. In operation SBC, the measured value storing unit 32 stores, for each of the queues 21-1 to 21-N, the cumulative output data amount measured by the cumulative output amount measuring unit 31.

In operation SBD, the measured value storing unit 32 reports the cumulative output data amount, stored for the selected queue at the time of the previous measurement, to the output amount calculating unit 33. The output amount calculating unit 33 calculates the amount of data output from the selected queue during the period between the previous measurement and the current measurement. In operation SBE, the rate calculating unit 34 calculates, from the output data amount reported from the output amount calculating unit 33, the output rate RO of the packets output from the selected queue. After that, the rate measurement control unit 30 selects the next queue, and returns the process to operation SBB. In an alternative embodiment, the above operations SBA to SBF may be implemented as steps.

In the present embodiment, since the output rate of each queue is measured periodically at predetermined intervals of time, as described above, there is no need to calculate the measurement interval. This serves to simplify the process and accomplish real-time measurements of many queues in a short period of time.

Figure 11:
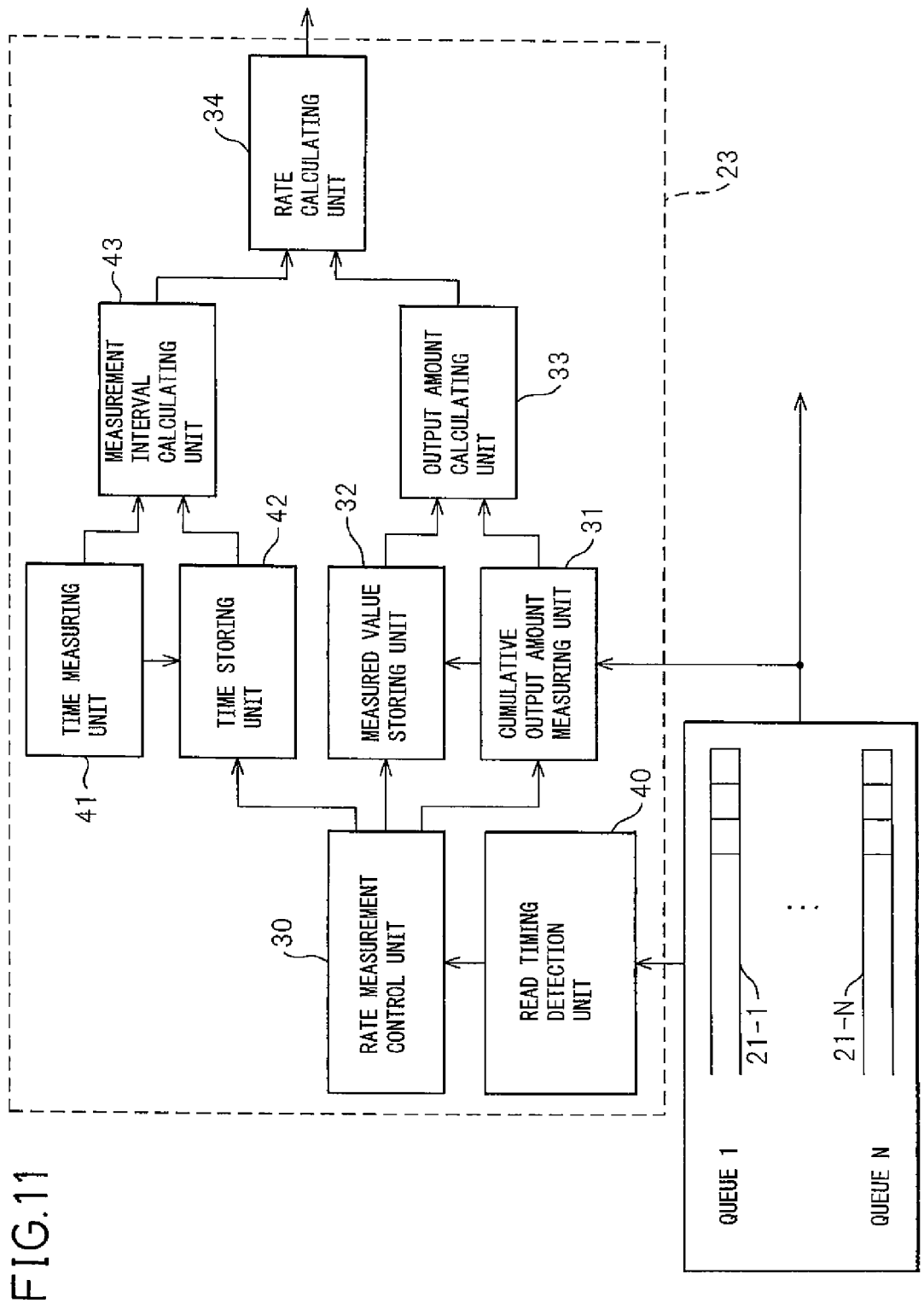
FIG. 11 is a diagram illustrating a second configuration example of the rate measuring unit depicted in FIG. 6.

FIG. 11 is a diagram illustrating a second configuration example of the rate measuring unit 23 depicted in FIG. 6. In this embodiment also, the input packet buffer 11-1 includes N queues 21-1 to 21-N for temporarily holding the input packets. Reference numeral 40 is a read timing detection unit, 41 is a time measuring unit, 42 is a time storing unit, and 43 is a measurement interval calculating unit. The rate measuring unit 23 thus includes the rate measurement control unit 30, the cumulative output amount measuring unit 31, the measured value storing unit 32, the output amount calculating unit 33, the rate calculating unit 34, the read timing detection unit 40, the time measuring unit 41, the time storing unit 42, and the measurement interval calculating unit 43.

The cumulative output amount measuring unit 31, the measured value storing unit 32, and the output amount calculating unit 33 are identical in function to the corresponding units described with reference to FIG. 9. When a data read occurs to any one of the queues 21-1 to 21-N, the read timing detection unit 40 detects the queue to which the data read has occurred, and reports it to the rate measurement control unit 30. The rate measurement control unit 30 sends notification of the detected queue to the cumulative output amount measuring unit 31, the measured value storing unit 32, and the time storing unit 42 to notify them of the queue whose packet output rate is to be measured.

The time measuring unit 41 measures the current time. When the notification of the detected queue is received from the rate measurement control unit 30, the time storing unit 42 stores the current time as the measuring time of the queue designated to be measured, and outputs the previously stored measuring time to report to the measurement interval calculating unit 43. The measurement interval calculating unit 43 calculates the measurement interval T1 at which the measurement was made on the designated queue from the difference between the current time and the previous measuring time reported from the time storing unit 42. The measurement interval calculating unit 43 reports the thus calculated measurement interval T1 to the rate calculating unit 34.

The rate calculating unit 34 calculates, from the output data amount reported from the output amount calculating unit 33 and the measurement interval T1 reported from the measurement interval calculating unit 43, the output rate RO of the packets output from the designated queue (RO=Output Data Amount/Measurement Interval T1), and outputs the thus calculated output rate. Rather than outputting the successively calculated output rate RO, the rate calculating unit 34 may output the weighted moving average value of the output rate RO. Here, an average value other than the weighted moving average value may be obtained by using, for example, an arithmetic average method, an exponentially weighted time average method, or a least square method.

Figure 12:
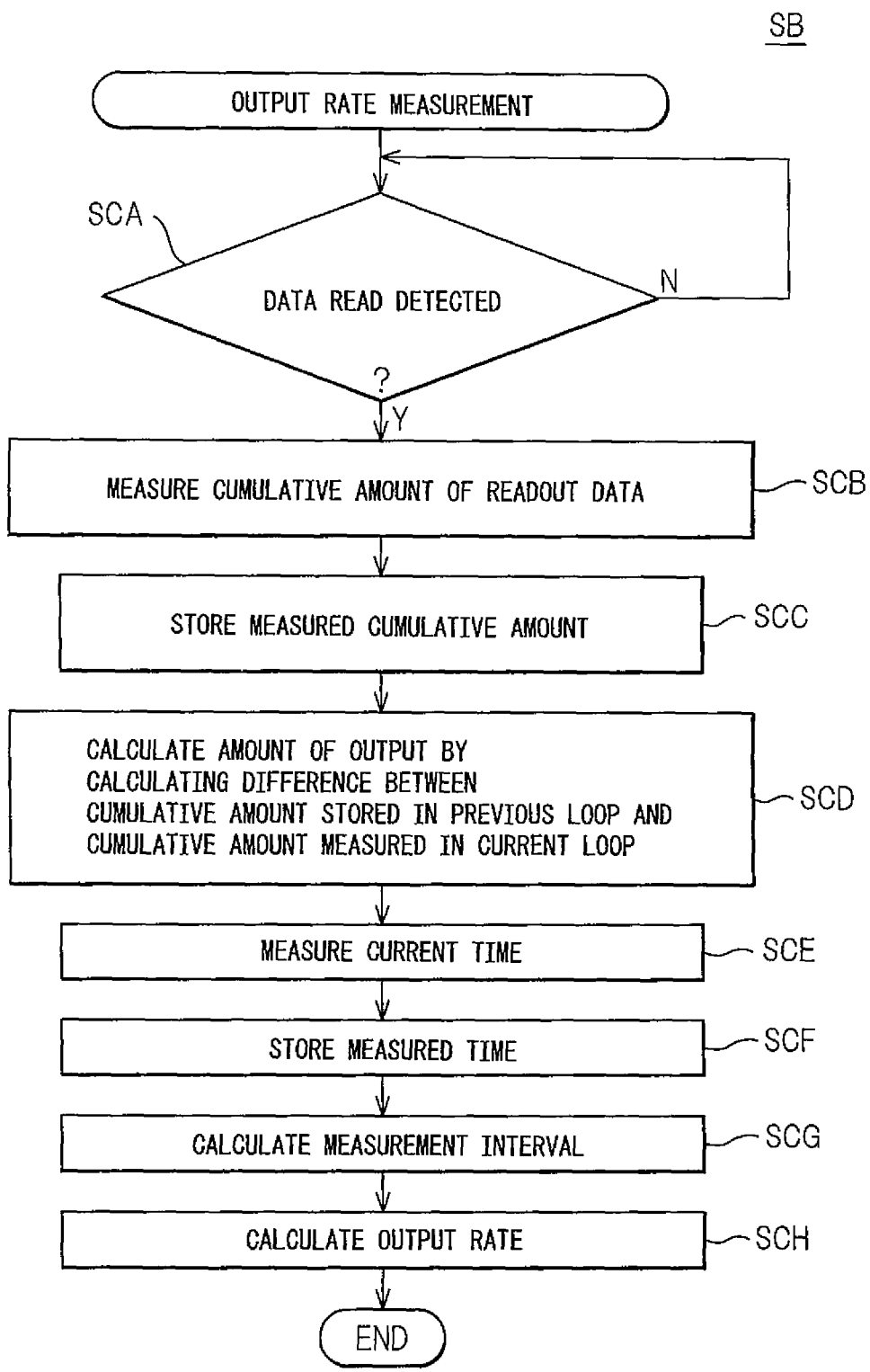
FIG. 12 is a diagram illustrating a second example of the rate measuring method.

FIG. 12 is a diagram illustrating a second example of the rate measuring method. The output rate in operation SB in FIG. 7 and FIG. 8 may be measured in accordance with the rate measuring method described hereinafter with reference to FIG. 12. In operation SCA, the read timing detection unit 40 detects whether a data read has occurred to any one of the queues 21-1 to 21-N. If no data read has been detected (N in operation SCA), the rate measuring unit 23 returns the process to operation SCA.

If a data read has been detected (Y in operation SCA), then in operation SCB the cumulative output amount measuring unit 31 counts the amount of data read out of the detected queue designated to be measured, and obtains the cumulative amount of readout data. The cumulative output amount measuring unit 31 reports the cumulative amount of data read out of the designated queue to the measured value storing unit 32 and the output amount calculating unit 33. In operation SCC, the measured value storing unit 32 stores, for each of the queues 21-1 to 21-N, the cumulative readout data amount measured by the cumulative output amount measuring unit 31.

In operation SCD, the measured value storing unit 32 reports the cumulative readout data amount, stored for the designated queue at the time of the previous measurement, to the output amount calculating unit 33. The output amount calculating unit 33 calculates the amount of data output from the designated queue by calculating the amount of data read out of the designated queue during the period between the previous measurement and the current measurement.

In operation SCE, the time measuring unit 41 measures the current time. In operation SCF, the time storing unit 42 stores the current time as the measuring time of the queue designated to be measured, and outputs the previously stored measuring time to report to the measurement interval calculating unit 43. In operation SCG, the measurement interval calculating unit 43 calculates the measurement interval T1 at which the measurement was made on the designated queue from the difference between the current time and the previous measuring time reported from the time storing unit 42.

In operation SCH, the rate calculating unit 34 calculates, from the output data amount reported from the output amount calculating unit 33 and the measurement interval T1 reported from the measurement interval calculating unit 43, the output rate RO of the packets output from the designated queue. Rather than outputting the successively calculated output rate RO, the rate calculating unit 34 may output the weighted moving average value of the output rate RO. Using the weighted moving average value offers the advantage of being able to achieve stable control by eliminating the effects of an abrupt change that may occur in the output rate. In an alternative embodiment, the above operations SCA to SCH may be implemented as steps.

In the present embodiment, when data is read out of a queue, the output rate of the queue is measured based on the amount of readout data. Alternatively, a data write timing detection unit for detecting a data write to a queue may be provided, and when data is written, the output rate may be measured based on the amount of written data.

In the present embodiment, by measuring the output rate of each queue when data is read out of the queue or when data is written to the queue, the measured value of the output rate of each queue can be determined in real time at the timing that the measured value changes. This serves to improve the responsiveness to the change in output rate. Furthermore, the measurement process can be prevented from being performed needlessly when no data read or data write occurs.

Figure 13:
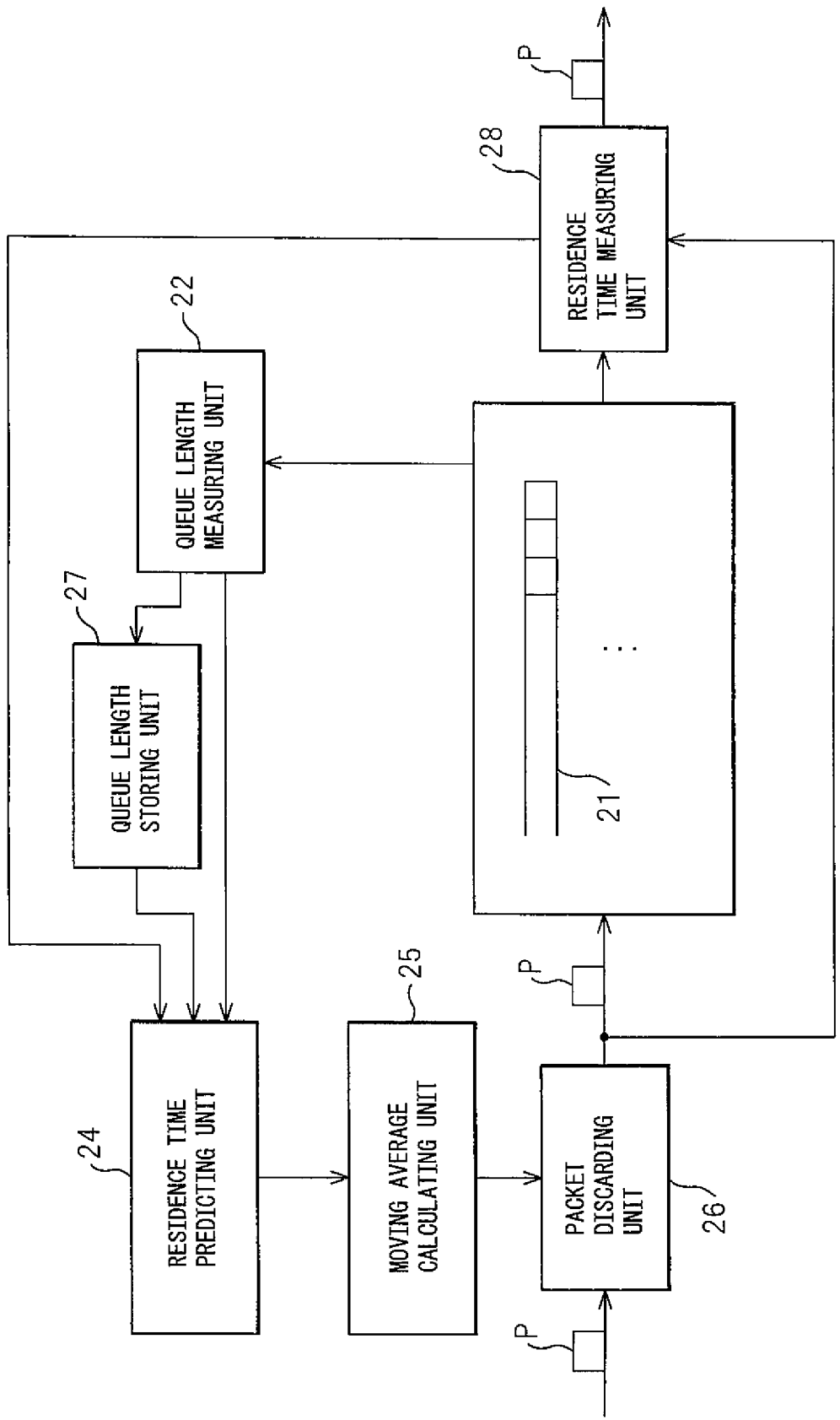
FIG. 13 is a diagram illustrating a second configuration example of the input packet buffer depicted in FIG. 5.

FIG. 13 is a diagram illustrating the second configuration example of the input packet buffer 11-1 depicted in FIG. 5. Reference numeral 27 is a queue length storing unit, and 28 is a residence time measuring unit. The other reference numerals designate the same component elements as those designated by the same reference numerals in FIG. 6. The input packet buffer 11-1 thus includes the queue 21, the queue length measuring unit 22, the residence time predicting unit 24, the moving average calculating unit 25, the packet discarding unit 26, the queue length storing unit 27, and the residence time measuring unit 28.

The queue length measuring unit 22 measures, for each packet, the queue length when the packet has arrived at the queue 21 (hereinafter called the "arrival queue length") and the queue length when the packet is read out from the head of the queue 21 (hereinafter referred to as "current queue length"). The queue length measuring unit 22 stores the arrival queue length on a packet-by-packet basis in the queue length storing unit 27.

The residence time measuring unit 28 measures the residence time of each packet in the queue 21 by calculating the difference between the time of arrival of the packet and the time that the packet is read out of the queue 21. The residence time predicting unit 24 calculates the amount of change of the current queue length relative to the arrival queue length (Current Queue Length/Arrival Queue Length) for each packet, and determines the residence time predicted value by calculating the product of the amount of change and the residence time of the packet (Predicted Value=Residence Time×Current Queue Length/Arrival Queue Length).

When measuring the arrival queue length and the current queue length, the queue length measuring unit 22 may output their weighted moving average values as the measurement results, rather than directly outputting the sequentially measured values. Using the weighted moving average values as the measurement results offers the advantage of preventing the residence time predicted value from becoming unstable due to an abrupt change in queue length. An average value other than the weighted moving average value may be obtained by using, for example, an arithmetic average method, an exponentially weighted time average method, or a least square method.

Figure 14:
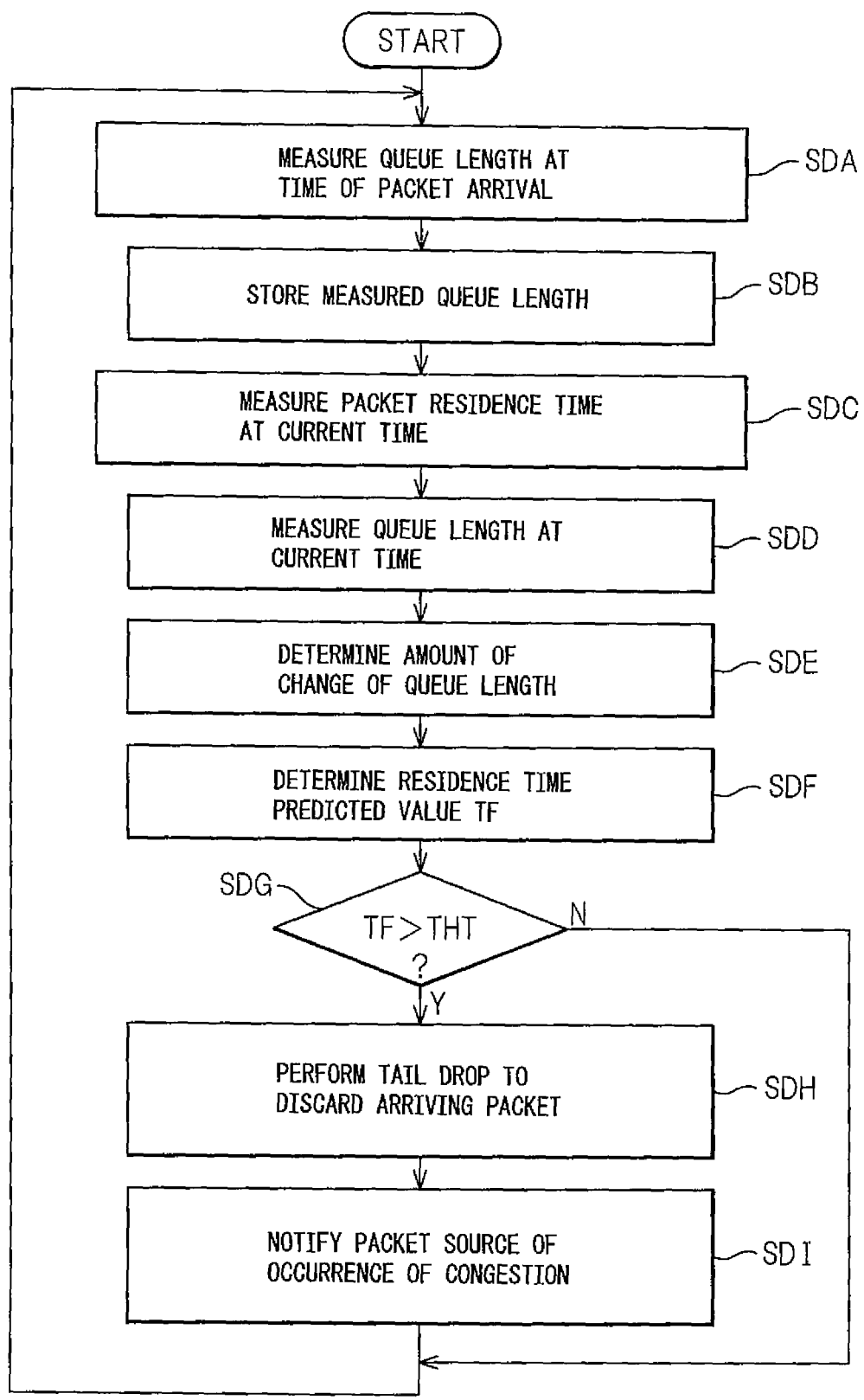
FIG. 14 is a diagram illustrating a third example of the packet discarding method.

FIG. 14 is a diagram illustrating a third example of the packet discarding method. In operation SDA, the queue length measuring unit 22 measures the queue length of the queue 21 at the time of packet arrival, i.e., the arrival queue length. In operation SDB, the queue length measuring unit 22 stores the arrival queue length in the queue length storing unit 27.

In operation SDC, the residence time measuring unit 28 measures the residence time of each packet in the queue 21 by calculating the difference between the time of arrival of the packet and the time that the packet is read out of the queue 21.

In operation SDD, for the packet upon arrival of which the queue length was measured in operation SDA, the queue length measuring unit 22 measures the queue length when the packet is read out of the queue 21, i.e., the current queue length.

In operation SDE, the residence time predicting unit 24 calculates the amount of change of the current queue length relative to the arrival queue length (Current Queue Length/Arrival Queue Length) for each packet. In operation SDF, the residence time predicting unit 24 determines the residence time predicted value by calculating the product of the amount of change measured in operation SDE and the residence time of the packet. The moving average calculating unit 25 calculates the average predicted value TF of the residence time predicted by the residence time predicting unit 24.

In operation SDG, the packet discarding unit 26 determines whether or not the average predicted value TF calculated by the moving average calculating unit 25 exceeds a predetermined maximum allowable residence time THT. If the average predicted value TF does not exceed the maximum allowable residence time THT (N in operation SDG), the input packet buffer 11-1 returns the process to operation SDA.

If the average predicted value TF exceeds the maximum allowable residence time THT (Y in operation SDG), the packet discarding unit 26 transfers the process to operation SDH. In operation SDH, the packet discarding unit 26 does not store the arriving packet in the queue 21 but discards the packet. That is, the packet discarding unit 26 performs Tail Drop based on the predicted value of the packet residence time. Further, when discarding the packet, the packet discarding unit 26 in operation SDI explicitly notifies the packet source that congestion has occurred in the switch 10. After that, the input packet buffer 11-1 returns the process to operation SDA.

In the present embodiment, the packet discarding unit 26 has been described as determining whether congestion has occurred or not by comparing the average predicted value TF with the maximum allowable residence time THT. Alternatively, the packet discarding unit 26 may perform WRED by determining the input packet discard rate according to the average predicted value TF in the same manner as in operations SH, SI, SJ, and SG illustrated in FIG. 8. In an alternative embodiment, the above operations SDA to SDI may be implemented as steps.

According to the present embodiment, since the residence time predicting unit 24 calculates the predicted value based on the amount of change of the queue length, the residence time can be predicted by considering how the queue length tends to change.

Figure 15:
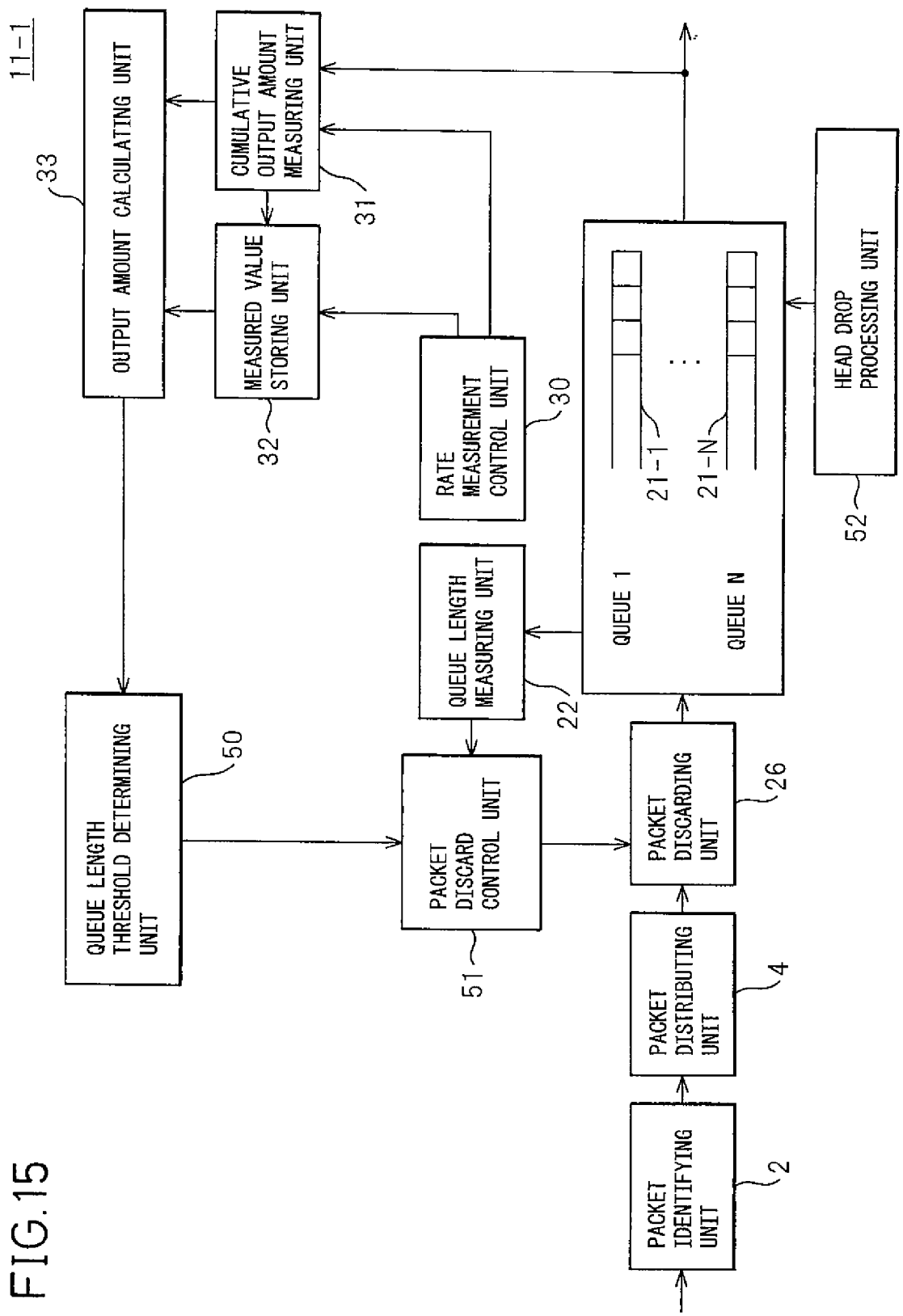
FIG. 15 is a diagram illustrating a third configuration example of the input packet buffer depicted in FIG. 5.

FIG. 15 is a diagram illustrating the third configuration example of the input packet buffer 11-1 depicted in FIG. 5. Reference numeral 50 is a queue length threshold determining unit, 51 is a packet discard control unit, and 52 is a head drop processing unit.

The input packet buffer 11-1 includes the packet identifying unit 2, the packet distributing unit 4, the N queues 21-1 to 21-N, the queue length measuring unit 22, and the packet discarding unit 26. The input packet buffer 11-1 further includes the rate measurement control unit 30, the cumulative output amount measuring unit 31, the measured value storing unit 32, and the output amount calculating unit 33. The input packet buffer 11-1 further includes the queue length threshold determining unit 50, the packet discard control unit 51, and the head drop processing unit 52.

The rate measurement control unit 30, the cumulative output amount measuring unit 31, the measured value storing unit 32, and the output amount calculating unit 33 are identical in function to the corresponding units described with reference to FIG. 9. That is, the rate measurement control unit 30, the cumulative output amount measuring unit 31, the measured value storing unit 32, and the output amount calculating unit 33 measure the amount of data output from each of the queues 21-1 to 21-N at every predetermined measurement period T0.

The packet identifying unit 2 identifies whether the input packets comply with the specification of input bandwidth prescribed for the source user, and classifies the packets into those that comply with the specification and those that do not. The packet distributing unit 4 distributes each input packet to one of the queues 21-1 to 21-N according to the input packet destination, user, application, etc. The head drop processing unit 52 measures the residence time of each packet held in the queues 21-1 to 21-N. Any packets held in the queue for a time exceeding a reference value are discarded by the head drop processing unit 52, starting from the packet at the head of the queue, regardless of whether or not the packets comply with the specification of input bandwidth.

The queue length threshold determining unit 50 receives the output data amount calculated by the output amount calculating unit 33 for each of the queues 21-1 to 21-N. The queue length threshold determining unit 50 calculates the queue length threshold value THQ for each of the queues 21-1 to 21-N, based on the maximum allowable residence time THT as a given constant, the predetermined measurement period T0, and the output data amount received from the output amount calculating unit 33 (Queue Length Threshold Value THQ=Maximum Allowable Residence Time THT/Measurement Period T0×Output Data Amount). The queue length threshold determining unit 50 supplies the queue length threshold value THQ to the packet discard control unit 51.

The packet discard control unit 51 determines whether the queue length measured by the queue length measuring unit 22 for each of the queues 21-1 to 21-N exceeds the queue length threshold value THQ calculated by the queue length threshold determining unit 50 for the corresponding one of the queues 21-1 to 21-N. Since the packet output rate of each of the queues 21-1 to 21-N is equal to (Output Data Amount/Measurement Period T0), if the queue length LQ is larger than the queue length threshold value THQ, the residence time given by the predicted value (Queue Length LQ/Output Rate) becomes longer than the maximum allowable residence time THT. The packet discard control unit 51 instructs the packet discarding unit 26 to perform Tail Drop on any queue whose queue length LQ exceeds the queue length threshold value THQ.

When a packet that does not comply with the specification of input bandwidth is input for the queue on which Tail Drop is to be performed, the packet discarding unit 26 does not store it in the queue but discards it. On the other hand, if the packet input for the queue on which Tail Drop is to be performed is one that complies with the specification of input bandwidth, the packet discarding unit 26 stores the packet in the queue.

Figure 16:
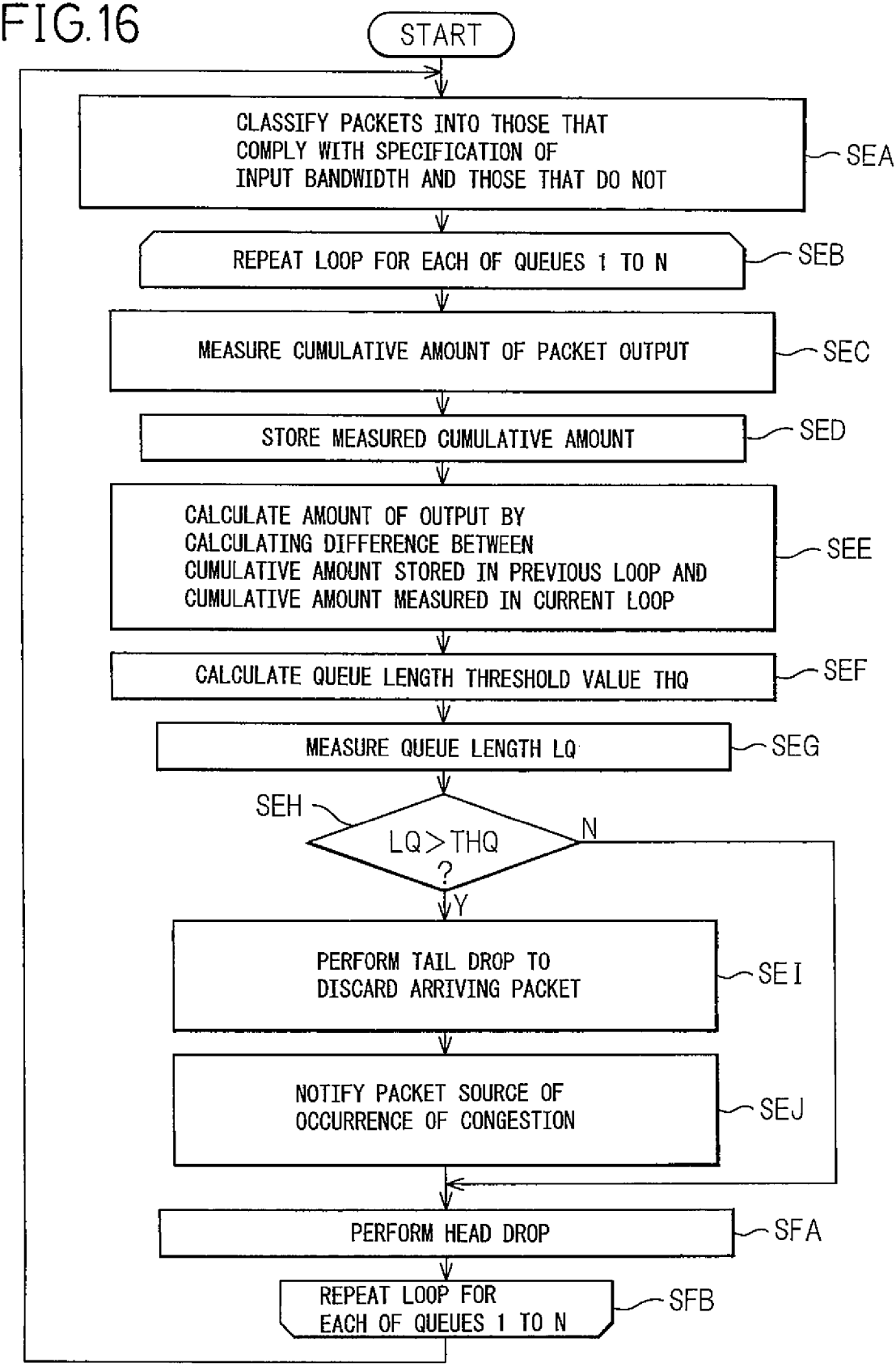
FIG. 16 is a diagram illustrating a fourth example of the packet discarding method.

FIG. 16 is a diagram illustrating a fourth example of the packet discarding method. In operation SEA, the packet identifying unit 2 identifies whether the input packets comply with the specification of input bandwidth prescribed for the source user, and classifies the packets into those that comply with the specification and those that do not. The packet discarding unit 26 places the packets that comply with the specification into the queue.

Then, the loop of SEB to SFB is repeated for each of the queues 21-1 to 21-N. In the process repeated through the loop of SEB to SFB, the rate measurement control unit 30 sequentially selects each of the N queues 21-1 to 21-N, periodically with the predetermined measurement period T0, as the queue whose packet output rate is to be measured.

The cumulative output amount measuring unit 31 counts the amount of data output from each of the queues 21-1 to 21-N and obtains the cumulative amount of output data. In operation SEC, the cumulative output amount measuring unit 31 reports the cumulative output data amount, measured on the selected queue, to the measured value storing unit 32 and the output amount calculating unit 33. In operation SED, the measured value storing unit 32 stores, for each of the queues 21-1 to 21-N, the cumulative output data amount measured by the cumulative output amount measuring unit 31.

In operation SEE, the measured value storing unit 32 reports the cumulative output data amount, stored for the selected queue at the time of the previous measurement, to the output amount calculating unit 33. The output amount calculating unit 33 calculates the amount of data output from the selected queue during the period between the previous measurement and the current measurement. In operation SEF, the queue length threshold determining unit 50 calculates the queue length threshold value THQ for the selected queue, based on the maximum allowable residence time THT as a given constant, the predetermined measurement period T0, and the output data amount received from the output amount calculating unit 33.

In operation SEG, the queue length measuring unit 22 measures the queue length LQ of the selected queue. In operation SEH, the packet discard control unit 51 determines whether or not the queue length LQ of the selected queue exceeds the queue length threshold value THQ calculated by the queue length threshold determining unit 50. If the queue length LQ does not exceed the queue length threshold value THQ (N in operation SEH), the input packet buffer 11-1 transfers the process to operation SFA.

If the queue length LQ exceeds the queue length threshold value THQ (Y in operation SEH), then in operation SEI the packet discarding unit 26 does not store any arriving packet in the selected queue but discards it if the arriving packet does not comply with the specification of input bandwidth. In operation SEJ, the packet discarding unit 26 explicitly notifies the packet source that congestion has occurred in the switch 10. After that, the input packet buffer 11-1 transfers the process to operation SFA.

In operation SFA, the head drop processing unit 52 measures the residence time of each packet held in the selected queue. Any packets held in the queue for a time exceeding a reference value are discarded by the head drop processing unit 52, starting from the packet at the head of the queue, regardless of whether or not the packets comply with the specification of input bandwidth. After that, the input packet buffer 11-1 returns the process to operation SEA. In an alternative embodiment, the above operations SEA to SFB may be implemented as steps.

A value larger than the maximum allowable residence time THT may be used as the reference value with which the head drop processing unit 52 compares the packet residence time in order to determine whether the packet is to be discarded or not. By using such a value, any packet that does not comply with the specification of input bandwidth can be discarded earlier than the packets that comply with the specification of input bandwidth.

According to the third configuration example, the amount of data output from each queue is measured at every predetermined period T0. As a result, a coefficient (Maximum Allowable Residence Time/Measurement Period T0) can be used as a constant in the equation for calculating the queue length threshold value THQ (=Maximum Allowable Residence Time/Measurement Period T0×Output Data Amount). This serves to simplify the circuit for calculating the queue length threshold value THQ.

In the above configuration example, the head drop processing unit 52 may be omitted. In that case, all the packets may be selected as the packets to be discarded by the packet discarding unit 26, regardless of whether or not the packets comply with the specification of input bandwidth. Further, the length of the maximum allowable residence time may be varied according to whether a packet complies with the specification of input bandwidth. For example, when making a determination as to whether or not to discard a packet that complies with the specification of input bandwidth, the maximum allowable residence time may be made longer than that used when making a determination on a packet that does not comply with the specification. This also applies to the fourth to seventh configuration examples to be described hereinafter.

Figure 17:
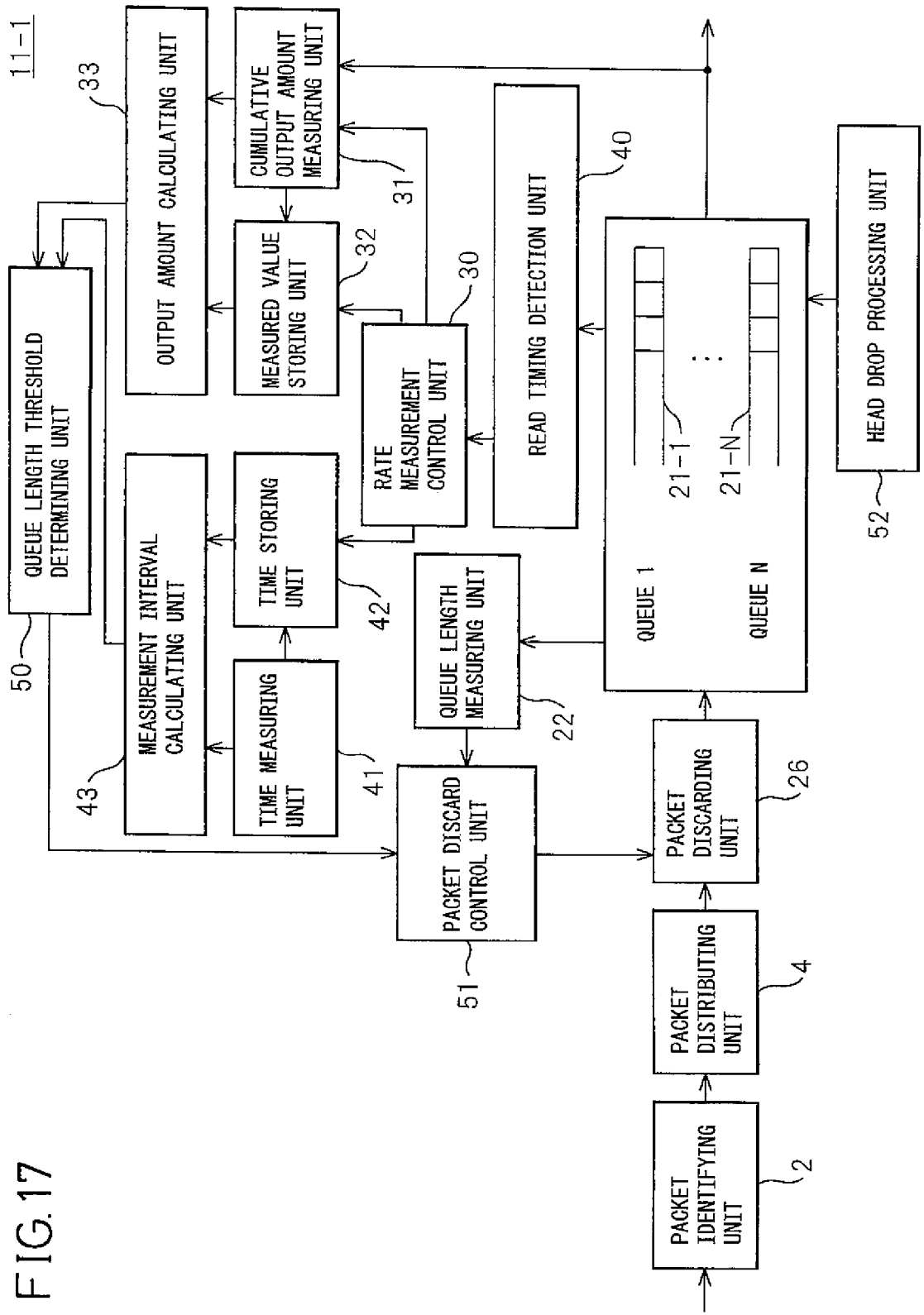
FIG. 17 is a diagram illustrating a fourth configuration example of the input packet buffer depicted in FIG. 5.

FIG. 17 is a diagram illustrating the fourth configuration example of the input packet buffer 11-1 depicted in FIG. 5. The input packet buffer 11-1 includes the packet identifying unit 2, the packet distributing unit 4, the N queues 21-1 to 21-N, the queue length measuring unit 22, and the packet discarding unit 26. The input packet buffer 11-1 further includes the rate measurement control unit 30, the cumulative output amount measuring unit 31, the measured value storing unit 32, and the output amount calculating unit 33. The input packet buffer 11-1 further includes the read timing detection unit 40, the time measuring unit 41, the time storing unit 42, and the measurement interval calculating unit 43. The input packet buffer 11-1 further includes the queue length threshold determining unit 50, the packet discard control unit 51, and the head drop processing unit 52.

The rate measurement control unit 30, the cumulative output amount measuring unit 31, the measured value storing unit 32, the output amount calculating unit 33, the read timing detection unit 40, the time measuring unit 41, the time storing unit 42, and the measurement interval calculating unit 43 are identical in function to the corresponding units described with reference to FIG. 11. When the read timing detection unit 40 has detected the occurrence of a data read from any one of the queues 21-1 to 21-N, the rate measurement control unit 30 specifies the detected queue as the queue whose output data amount is to be measured. The cumulative output amount measuring unit 31, the measured value storing unit 32, and the output amount calculating unit 33 determine the output data amount for the specified queue by calculating the amount of data read out of the queue during the period between the previous measurement and the current measurement. The time measuring unit 41, the time storing unit 42, and the measurement interval calculating unit 43 calculate the measurement interval between the previous measurement and the current measurement.

The queue length threshold determining unit 50 receives the output data amount calculated by the output amount calculating unit 33 for each of the queues 21-1 to 21-N. The queue length threshold determining unit 50 calculates the queue length threshold value THQ for each of the queues 21-1 to 21-N, based on the output data amount received from the output amount calculating unit 33 and the measurement interval T1 received from the measurement interval calculating unit 43 (Queue Length Threshold Value THQ=Maximum Allowable Residence Time THT/Measurement Interval T1×Output Data Amount). The queue length threshold determining unit 50 supplies the queue length threshold value THQ to the packet discard control unit 51.

The packet discard control unit 51, the packet discarding unit 26, the packet identifying unit 2, the packet distributing unit 4, and the head drop processing unit 52 are identical in function to the corresponding units described with reference to FIG. 15.

Figure 18:
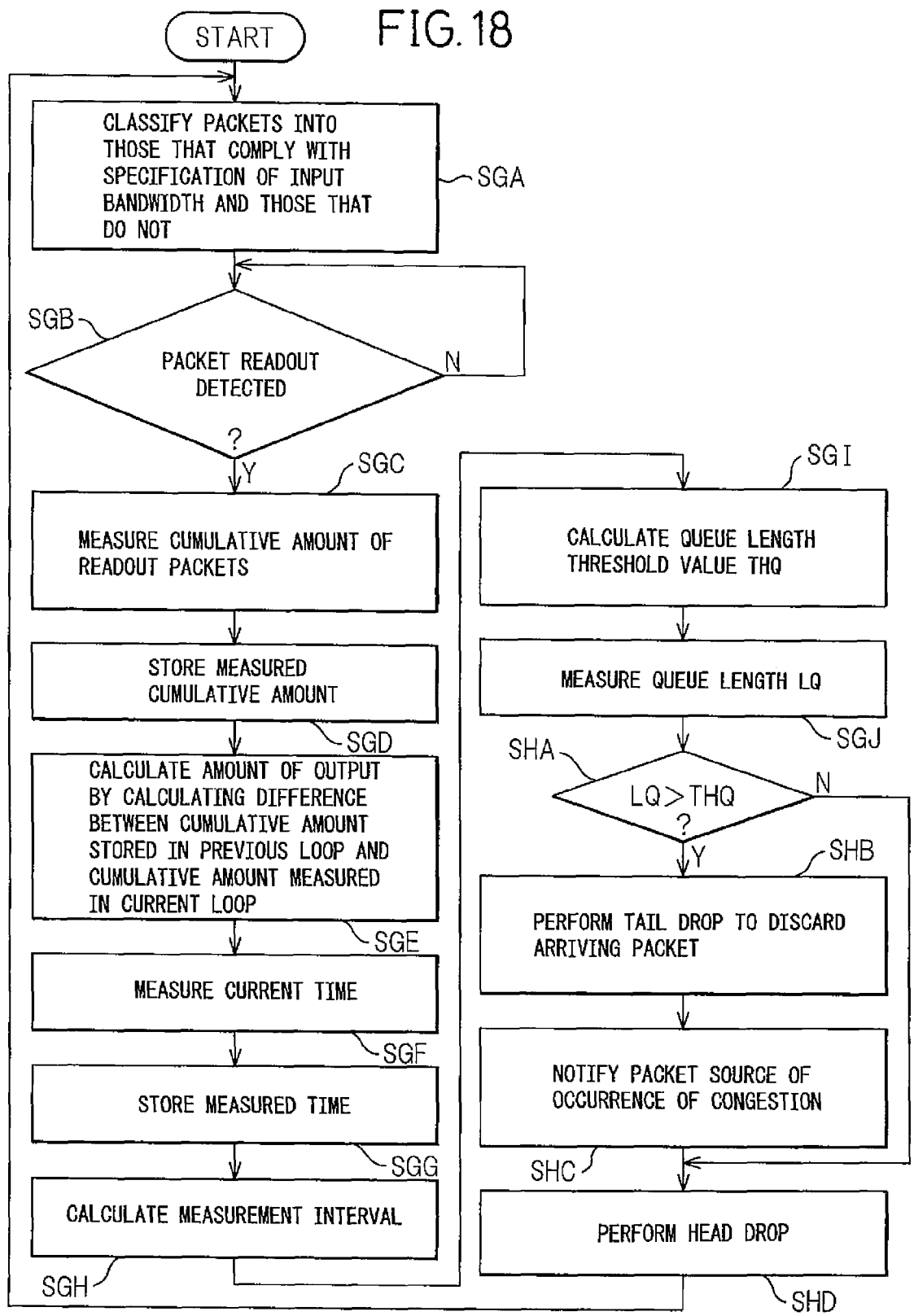
FIG. 18 is a diagram illustrating a fifth example of the packet discarding method.

FIG. 18 is a diagram illustrating a fifth example of the packet discarding method. In operation SGA, the packet identifying unit 2 identifies whether the input packets comply with the specification of input bandwidth prescribed for the source user, and classifies the packets into those that comply with the specification and those that do not. The packet discarding unit 26 places the packets that comply with the specification into the queue.

In operation SGB, the read timing detection unit 40 detects whether a data read has occurred to any one of the queues 21-1 to 21-N. If no data read has been detected (N in operation SGB), the input packet buffer 11-1 returns the process to operation SGB.

If a data read has been detected (Y in operation SGB), then in operation SGC the cumulative output amount measuring unit 31 counts the amount of data read out of the detected queue designated to be measured, and obtains the cumulative amount of readout data. The cumulative output amount measuring unit 31 reports the cumulative amount of data read out of the designated queue to the measured value storing unit 32 and the output amount calculating unit 33. In operation SGD, the measured value storing unit 32 stores, for each of the queues 21-1 to 21-N, the cumulative readout data amount measured by the cumulative output amount measuring unit 31.

In operation SGE, the measured value storing unit 32 reports the cumulative readout data amount, stored for the designated queue at the time of the previous measurement, to the output amount calculating unit 33. The output amount calculating unit 33 calculates the amount of data output from the designated queue by calculating the amount of data read out of the designated queue during the period between the previous measurement and the current measurement.

In operation SGF, the time measuring unit 41 measures the current time. In operation SGG, the time storing unit 42 stores the current time as the measuring time of the queue designated to be measured, and outputs the previously stored measuring time to report to the measurement interval calculating unit 43. In operation SGH, the measurement interval calculating unit 43 calculates the measurement interval T1 at which the measurement was made on the designated queue from the difference between the current time and the previous measuring time reported from the time storing unit 42.

In operation SGI, the queue length threshold determining unit 50 calculates the queue length threshold value THQ for the designated queue, based on the maximum allowable residence time THT as a given constant, the output data amount received from the output amount calculating unit 33, and the measurement interval T1 received from the measurement interval calculating unit 43. The subsequent operations SGJ to SHD are the same as the corresponding operations SEG to SFA illustrated in FIG. 16. After operation SHD, the input packet buffer 11-1 returns the process to operation SGA. In an alternative embodiment, the above operations SGA to SHD may be implemented as steps.

In the present embodiment, when data is read out of a queue, the amount of data output from the queue is measured based on the amount of readout data. Alternatively, a data write timing detection unit for detecting a data write to a queue may be provided, and when data is written, the amount of data output from the queue may be measured based on the amount of written data. This also applies to the sixth embodiment to be described later.

According to the fourth configuration example, since the queue length threshold value THQ for each queue is determined when data is read out of the queue or when data is written to the queue, the queue length threshold value THQ can be determined in real time at the timing that traffic to the queue has actually occurred. This serves to improve the responsiveness to the change in the amount of traffic. Furthermore, the measurement process can be prevented from being performed needlessly when no data read or data write occurs.

Figure 19:
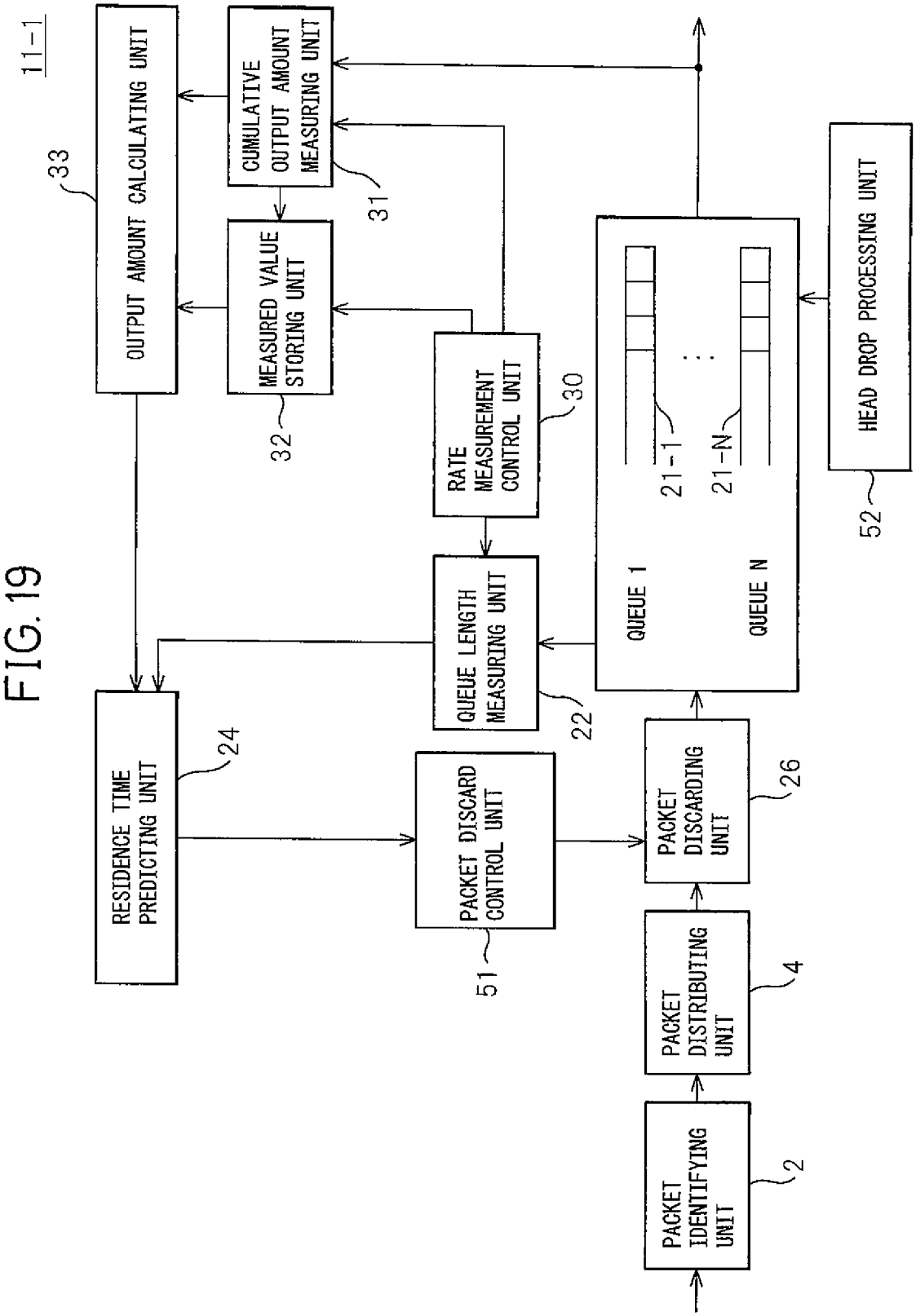
FIG. 19 is a diagram illustrating a fifth configuration example of the input packet buffer depicted in FIG. 5.

FIG. 19 is a diagram illustrating the fifth configuration example of the input packet buffer 11-1 depicted in FIG. 5. The input packet buffer 11-1 includes the packet identifying unit 2, the packet distributing unit 4, the N queues 21-1 to 21-N, the queue length measuring unit 22, the residence time predicting unit 24, and the packet discarding unit 26. The input packet buffer 11-1 further includes the rate measurement control unit 30, the cumulative output amount measuring unit 31, the measured value storing unit 32, and the output amount calculating unit 33. The input packet buffer 11-1 further includes the read timing detection unit 40, the time measuring unit 41, the time storing unit 42, and the measurement interval calculating unit 43. The input packet buffer 11-1 further includes the packet discard control unit 51 and the head drop processing unit 52.

The rate measurement control unit 30, the packet identifying unit 2, the packet distributing unit 4, the cumulative output amount measuring unit 31, the measured value storing unit 32, the output amount calculating unit 33, and the head drop processing unit 52 are the same as those depicted FIG. 15. The queue length measuring unit 22 measures the queue length of the designated queue selected by the output amount calculating unit 33. The residence time predicting unit 24 calculates the residence time predicted value TF (=Queue Length×Measurement Period T0/Output Data Amount), based on the queue length measured by the queue length measuring unit 22, the output data amount of the designated queue measured by the output amount calculating unit 33, and the measurement period T0. Rather than outputting the predicted value TF directly, the residence time predicting unit 24 may output its weighted moving average value as the predicted value TF. Here, an average value other than the weighted moving average value may be obtained by using, for example, an arithmetic average method, an exponentially weighted time average method, or a least square method.

The packet discard control unit 51 determines the input packet discard rate based on the residence time predicted value TF. The method of determining the discard rate may be the same as that described with reference to FIG. 8. When a packet that does not comply with the specification of input bandwidth is input for the queue for which the discard rate has been determined, the packet discarding unit 26 discards the packet in accordance with the discard rate determined by the packet discard control unit 51.

Figure 20:
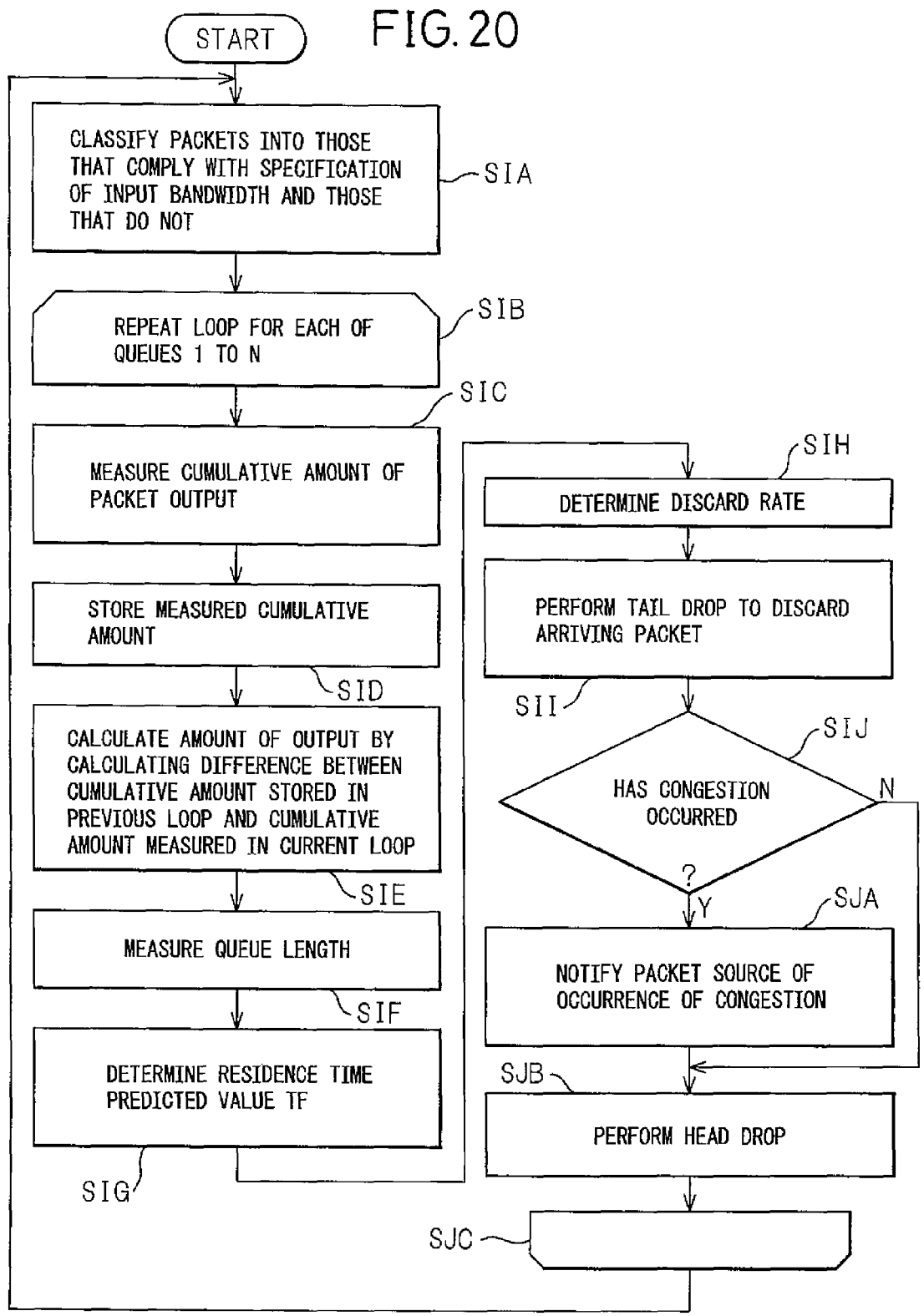
FIG. 20 is a diagram illustrating a sixth example of the packet discarding method.

FIG. 20 is a diagram illustrating a sixth example of the packet discarding method. In operation SIA, the packet identifying unit 2 identifies whether the input packets comply with the specification of input bandwidth prescribed for the source user, and classifies the packets into those that comply with the specification and those that do not. The packet discarding unit 26 places the packets that comply with the specification into the queue.

Then, the loop of SIB to SJC is repeated for each of the queues 21-1 to 21-N. In the process repeated through the loop of SIB to SJC, the rate measurement control unit 30 sequentially selects each of the N queues 21-1 to 21-N, periodically with the predetermined measurement period T0, as the queue whose packet output rate is to be measured.

In operations SIC to SIE, the output data amount of the selected queue is calculated in the same manner as in the operations SEC to SEE illustrated in FIG. 16. In operation SIF, the queue length measuring unit 22 measures the queue length of the selected queue. In operation SIG, the residence time predicting unit 24 calculates the residence time predicted value TF for the selected queue, based on the queue length measured by the queue length measuring unit 22, the output data amount of the selected queue measured by the output amount calculating unit 33, and the measurement period T0.

In operation SIH, the packet discard control unit 51 determines the input packet discard rate based on the residence time predicted value TF. In operation SII, when a packet that does not comply with the specification of input bandwidth is input for the selected queue in which the packet is to be held, the packet discarding unit 26 discards the packet in accordance with the discard rate determined in operation SIH.

In operation SIJ, the packet discarding unit 26 determines whether congestion has occurred or not by performing the same processing as that performed in operation SJ illustrated in FIG. 8. If it is determined that congestion has not occurred (N in operation SIJ), the input packet buffer 11-1 returns the process to operation SJB. If it is determined that congestion has occurred (Y in operation SIJ), the packet discarding unit 26 in operation SJA explicitly notifies the affected packet source that congestion has occurred in the switch 10. After that, the input packet buffer 11-1 returns the process to operation SJB.

In operation SJB, the head drop processing unit 52 measures the residence time of each packet held in the selected queue. Any packets held in the queue for a time exceeding a reference value are discarded by the head drop processing unit 52, starting from the packet at the head of the queue. After that, the input packet buffer 11-1 returns the process to operation SJA. In an alternative embodiment, the above operations SIA to SJB may be implemented as steps.

Figure 21:
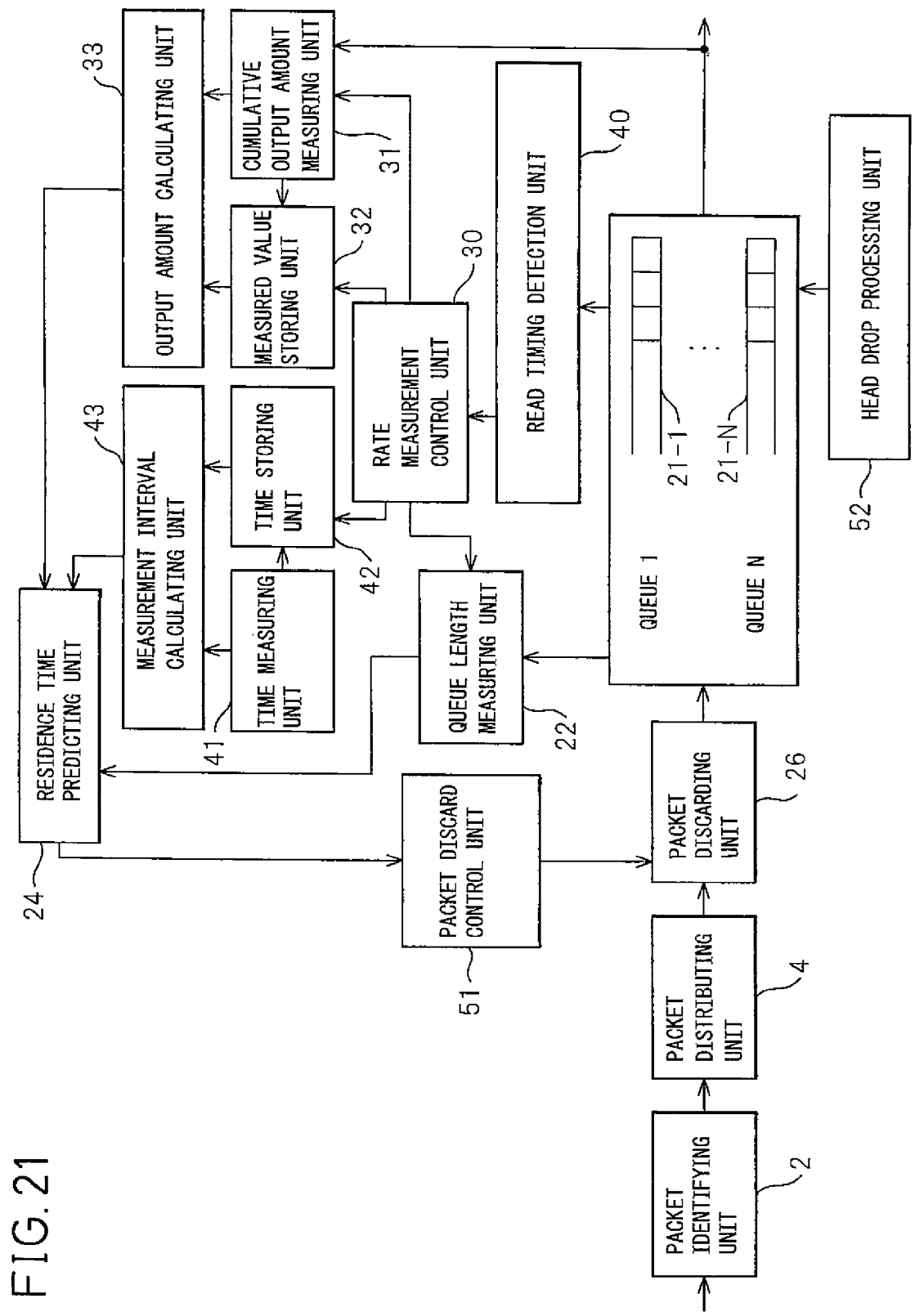
FIG. 21 is a diagram illustrating a sixth configuration example of the input packet buffer depicted in FIG. 5.

FIG. 21 is a diagram illustrating the sixth configuration example of the input packet buffer 11-1 depicted in FIG. 5. The input packet buffer 11-1 includes the packet identifying unit 2, the packet distributing unit 4, the N queues 21-1 to 21-N, the queue length measuring unit 22, the residence time predicting unit 24, and the packet discarding unit 26. The input packet buffer 11-1 further includes the rate measurement control unit 30, the cumulative output amount measuring unit 31, the measured value storing unit 32, and the output amount calculating unit 33. The input packet buffer 11-1 further includes the read timing detection unit 40, the time measuring unit 41, the time storing unit 42, and the measurement interval calculating unit 43. The input packet buffer 11-1 further includes the packet discard control unit 51 and the head drop processing unit 52.

The rate measurement control unit 30, the packet identifying unit 2, the packet distributing unit 4, the cumulative output amount measuring unit 31, the measured value storing unit 32, and the output amount calculating unit 33 are the same as those depicted FIG. 17. Further, the read timing detection unit 40, the time measuring unit 41, the time storing unit 42, the measurement interval calculating unit 43, and the head drop processing unit 52 are the same as those depicted FIG. 17. The packet discard control unit 51 and the packet discarding unit 26 are the same as those depicted FIG. 19.

The queue length measuring unit 22 measures the queue length of the designated queue selected by the output amount calculating unit 33. The residence time predicting unit 24 calculates the residence time predicted value TF (=Queue Length×Measurement Interval T1/Output Data Amount), based on the queue length measured by the queue length measuring unit 22, the output data amount of the designated queue measured by the output amount calculating unit 33, and the measurement interval T1 determined by the measurement interval calculating unit 43. Rather than outputting the predicted value TF directly, the residence time predicting unit 24 may output its weighted moving average value as the predicted value TF. An average value other than the weighted moving average value may be obtained by using, for example, an arithmetic average method, an exponentially weighted time average method, or a least square method.

Figure 22:
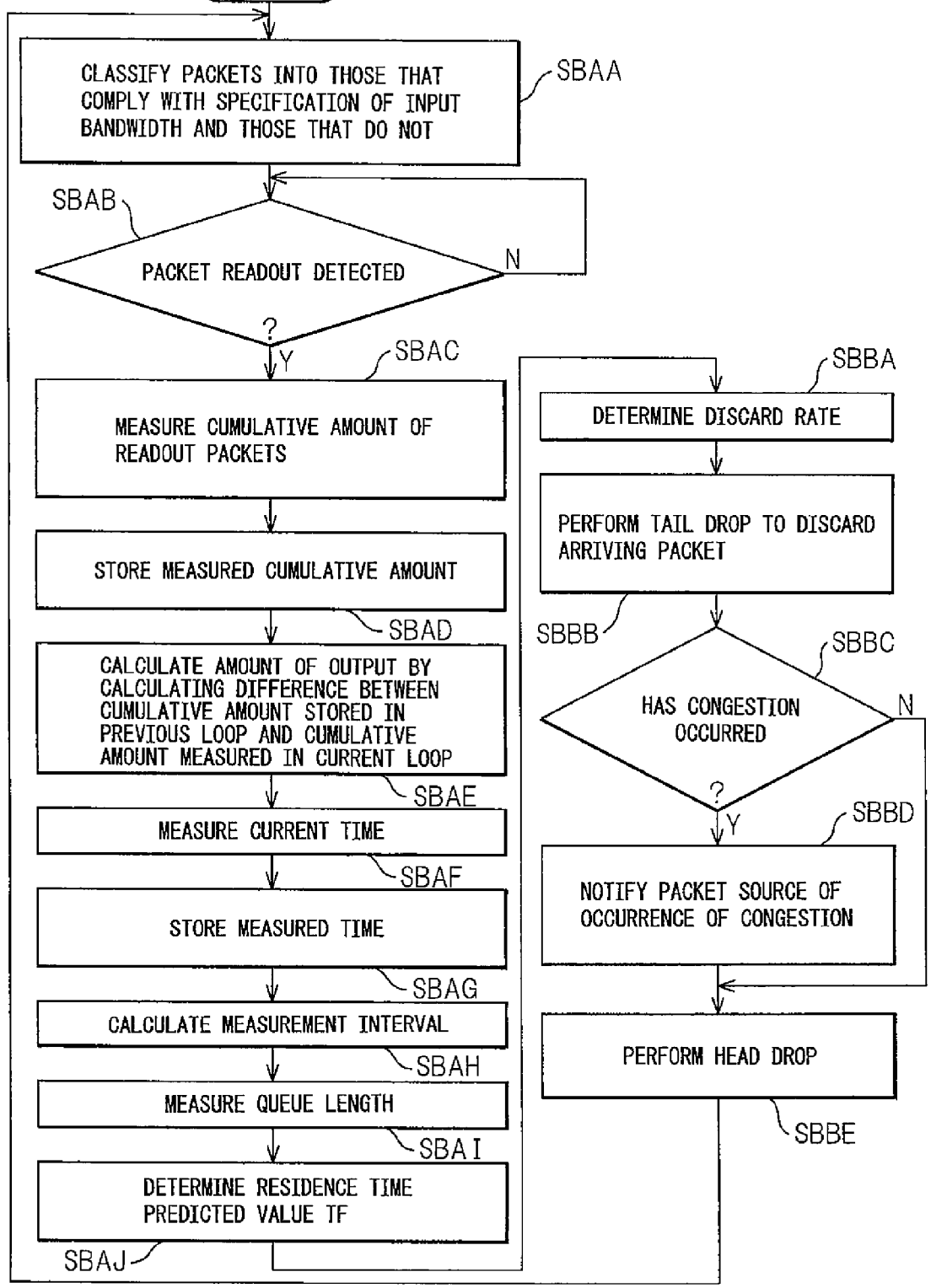
FIG. 22 is a diagram illustrating a seventh example of the packet discarding method.

FIG. 22 is a diagram illustrating a seventh example of the packet discarding method. In operation SBAA, the packet identifying unit 2 identifies whether the input packets comply with the specification of input bandwidth prescribed for the source user, and classifies the packets into those that comply with the specification and those that do not. The packet discarding unit 26 places the packets that comply with the specification into the queue.

In operation SBAB, the read timing detection unit 40 detects whether a data read has occurred to any one of the queues 21-1 to 21-N. If no data read has been detected (N in operation SBAB), the input packet buffer 11-1 returns the process to operation SBAB.

If a data read has been detected (Y in operation SBAB), then in operations SBAC to SBAH the output data amount and the measurement interval T1 are measured for the detected queue in the same manner as in operations SGC to SGH illustrated in FIG. 18.

In operation SBAI, the queue length measuring unit 22 measures the queue length of the designated queue. In operation SBAJ, the residence time predicting unit 24 calculates the residence time predicted value TF for the designated queue, based on the queue length measured by the queue length measuring unit 22, the output data amount of the designated queue measured by the output amount calculating unit 33, and the measurement interval T1 determined by the measurement interval calculating unit 43. The subsequent operations SBBA to SBBE are the same as the corresponding operations SIH to SJB illustrated in FIG. 20. After operation SBBE, the input packet buffer 11-1 returns the process to operation SBAA. In an alternative embodiment, the above operations SBAA to SBBE may be implemented as steps.

In the fifth and sixth configuration examples also, the head drop processing unit 52 may be omitted, and all the packets may be selected as the packets to be discarded by the packet discarding unit 26, regardless of whether or not the packets comply with the specification of input bandwidth. Further, the values of the parameters MinTh, MaxP, and MaxTh used to determine the discard rate may be made different between the packets that comply with the specification of input bandwidth and the packets that do not. For example, when making a determination as to whether or not to discard a packet that complies with the specification of input bandwidth, the parameters may be set so that the discard rate becomes smaller than when making a determination on a packet that does not comply with the specification. This also applies to the seventh configuration example to be described hereinafter.

In the fifth and sixth configuration examples, the packet discard control unit 51 and the packet discarding unit 26 have been described as calculating the residence time predicted value TF and discarding the packets in accordance with the discard rate determined based on the thus calculated residence time predicted value. Alternatively, the packet discard control unit 51 may determine whether or not the residence time predicted value TF is larger than the maximum allowable residence time THT, and the packet discarding unit 26 may discard any packet arriving at the queue for which the predicted value TF is larger than the maximum allowable residence time THT.

Figure 23:
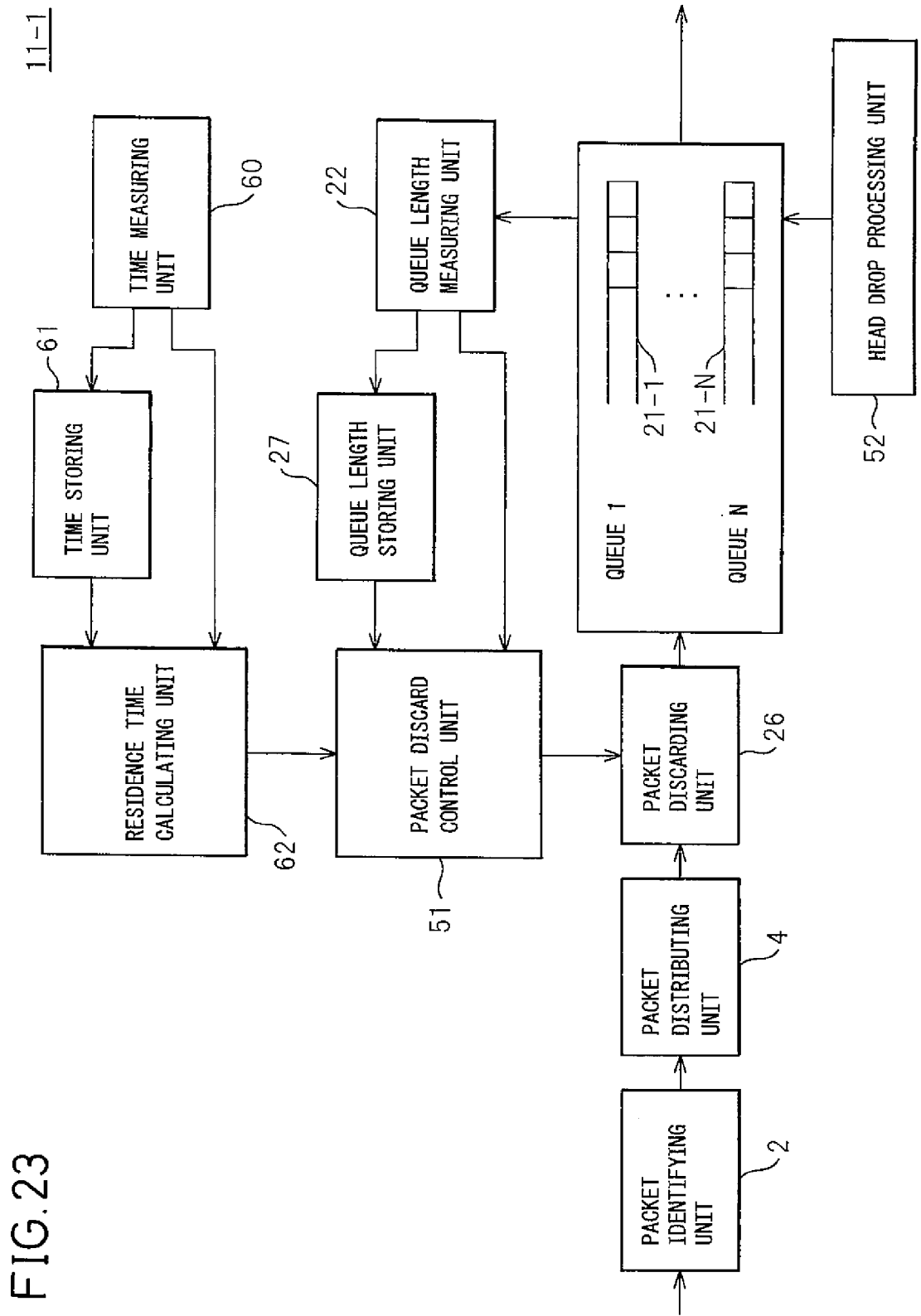
FIG. 23 is a diagram illustrating a seventh configuration example of the input packet buffer depicted in FIG. 5.

FIG. 23 is a diagram illustrating the seventh configuration example of the input packet buffer 11-1 depicted in FIG. 5. Reference numeral 60 is a time measuring unit, 61 is a time storing unit, and 62 is a residence time calculating unit. The input packet buffer 11-1 includes the packet identifying unit 2, the packet distributing unit 4, the N queues 21-1 to 21-N, the queue length measuring unit 22, the packet discarding unit 26, and the queue length storing unit 27. The input packet buffer 11-1 further includes the packet discard control unit 51, the head drop processing unit 52, the time measuring unit 60, the time storing unit 61, and the residence time calculating unit 62.

The packet identifying unit 2, the packet distributing unit 4, the packet discarding unit 26, and the head drop processing unit 52 are the same as those depicted in FIG. 15. The queue length measuring unit 22 measures, for each packet, the arrival queue length LQA which is the queue length when the packet has arrived at a designated one of the queues 21-1 to 21-N. The queue length measuring unit 22 also measures the current queue length LQC which is the queue length when the packet is read out from the head of the designated one of the queues 21-1 to 21-N. The queue length measuring unit 22 stores the arrival queue length LQA and the current queue length LQC on a packet-by-packet basis in the queue length storing unit 27.

The time measuring unit 60 measures, for each packet, the time at which the packet arrived at the designated one of the queues 21-1 to 21-N (hereinafter called the "arrival time") and the time at which the packet is read out from the head of the designated one of the queues 21-1 to 21-N (hereinafter called the "current time"). The time measuring unit 60 stores the arrival time on a packet-by-packet basis in the time storing unit 61. The residence time calculating unit 62 measures the residence time TS of each packet held in the queues 21-1 to 21-N by calculating the difference between the arrival time and the current time for the packet.

Based on the predetermined maximum allowable residence time THT and the arrival queue length LQA, current queue length LQC, and residence time TS determined by the queue length measuring unit 22 for each packet held in the queues 21-1 to 21-N, the packet discard control unit 51 determines for each queue whether the following conditional expression (1) is satisfied.

$$\text{Maximum Allowable Residence Time } THT \times \text{Arrival Queue Length } LQA < \text{Residence Time } TS \times \text{Current Queue Length } LQC \quad (1)$$

If the residence time predicted value TF is given by TF=(Residence Time TS×Current Queue Length LQC/Arrival Queue Length LQA), then the conditional expression (1) is equivalent to Predicted Value TF>Maximum Allowable Residence Time THT.

Namely, TF is a predicted value of the residence time of the packet arriving at the present time, which is obtained by multiplying the current residence time (TS) by the ratio of the current queue length (LQC) to the queue length at the timing when the leading packet arrived (LQA), i.e. the change ratio of the queue length between the timing when the leading packet arrived and the present time. Therefore, if the conditional expression (1) is satisfied, then the above calculated predicted value TF of the residence time of the packet arriving at the present time exceeds the Maximum Allowable Residence Time THT.

Based on the residence time TS and the predetermined reference value MINTS, the packet discard control unit 51 determines for each queue whether the following conditional expression (2) is satisfied.

Residence Time *TS*>Predetermined Reference Value *MINTS*  (2)

The packet discard control unit 51 instructs the packet discarding unit 26 to perform Tail Drop on any queue that satisfies the above conditional expressions (1) and (2). The effect of using the conditional expression (2) in addition to the conditional expression (1) is that even when the residence time predicted value TF is larger than the maximum allowable residence time THT, if the actual residence time does not exceed a given threshold value, the packet discard can be prevented from being initiated.

The conditional expression (2) is for preventing the packets from being discarded due to the error of predicting of TF, by preventing the packets from being discarded if the actual residence time TS does not exceed a given threshold value MINTS, although the residence time predicted value TF shows the packet buffer congestion.

Figure 24:
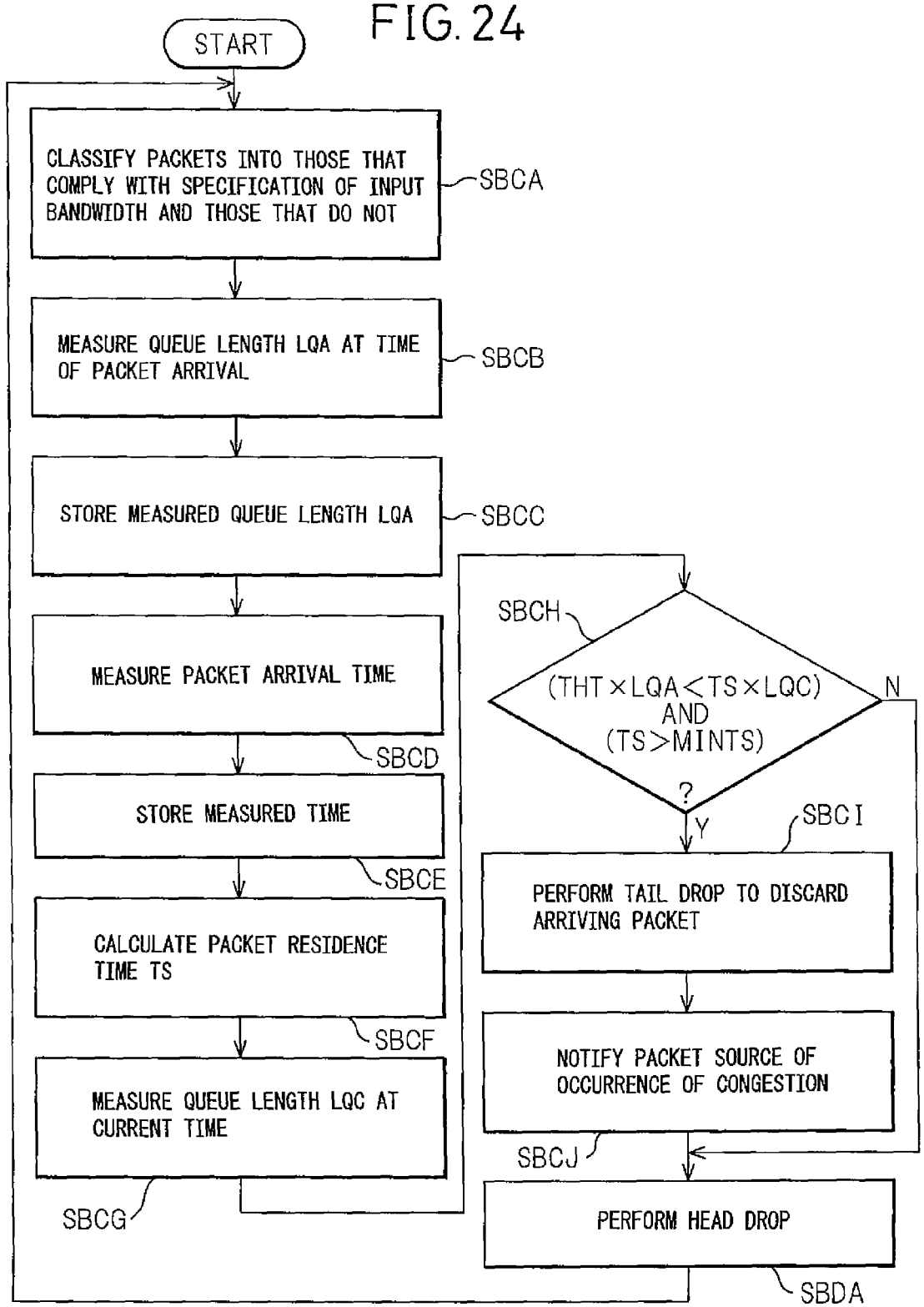
FIG. 24 is a diagram illustrating an eighth example of the packet discarding method.

FIG. 24 is a diagram illustrating an eighth example of the packet discarding method. In operation SBCA, the packet identifying unit 2 identifies whether the input packets comply with the specification of input bandwidth prescribed for the source user, and classifies the packets into those that comply with the specification and those that do not. The packet discarding unit 26 places the packets that comply with the specification into the queue.

In operation SBCB, the queue length measuring unit 22 measures the arrival queue length LQA for each packet arriving at the designated queue. In operation SBCC, the queue length measuring unit 22 stores the arrival queue length LQA on a packet-by-packet basis in the queue length storing unit 27. In operation SBCD, the time measuring unit 60 measures, for each packet, the time at which the packet arrived at the designated queue. In operation SBCE, the time measuring unit 60 stores the arrival time on a packet-by-packet basis in the time storing unit 61.

In operation SBCF, the residence time calculating unit 62 calculates the residence time TS for each packet in the queues 21-1 to 21-N by calculating the difference between the arrival time and the current time for the packet. In operation SBCG, the queue length measuring unit 22 measures the current queue length LQC when the packet for which the arrival queue length LQA was measured in operation SBCB is read out of the queue 21.

In operation SBCH, the packet discard control unit 51 determines whether the conditional expressions (1) and (2) are both satisfied. If one or neither of the conditional expressions (1) and (2) is satisfied (N in operation SBCH), the input packet buffer 11-1 transfers the process to operation SBDA.

If both of the conditional expressions (1) and (2) are satisfied (Y in operation SBCH), then in operation SBCI the packet discard control unit 51 instructs the packet discarding unit 26 to perform Tail Drop on the queue that satisfies both of the conditional expressions (1) and (2). When a packet that does not comply with the specification of input bandwidth arrives at the queue on which Tail Drop is performed, the packet discarding unit 26 discards the packet. In operation SBCJ, the packet discarding unit 26 explicitly notifies the packet source that congestion has occurred in the switch 10. The input packet buffer 11-1 transfers the process to operation SBDA. In operation SBDA, the head drop processing unit 52 performs the same processing as performed in operation SFA illustrated in FIG. 16. After that, the input packet buffer 11-1 returns the process to operation SBCA. In an alternative embodiment, the above operations SBCA to SBDA may be implemented as steps.

According to the present embodiment, since the evaluation of the above conditional expressions does not involve any division operations, there is no need to provide a dividing circuit.

In the present embodiment, the packet discard control unit 51 and the packet discarding unit 26 have been described as discarding the packet when (Maximum Allowable Residence Time THT×Current Queue Length LQC) is larger than (Residence Time TS×Arrival Queue Length LQA). Alternatively, the packet discard control unit 51 may calculate the residence time predicted value based on the residence time TS, the current queue length LQC, and the arrival queue length LQA, and may determine the input packet discard rate based on the residence time predicted value. The packet discarding unit 26 may perform WRED based on the thus determined discard rate.

In the present embodiment, the packet discard control unit 51 and the packet discarding unit 26 perform the packet discard only when the conditional expression (2) is satisfied, that is, only when the residence time TS exceeds the predetermined reference value MINTS. In the first to sixth configuration examples also, the packet discard may be performed only when the residence time TS exceeds the predetermined reference value MINTS.

In the above embodiments, the packet buffering device includes, for example, a processor, a memory, a logic circuit, and so on. The processor is a device for processing data. Examples of the processor include a central processing unit (CPU) and a digital signal processor (DSP). The memory is a device for storing data. Examples of the memory include a read only memory (ROM) and a random access memory (RAM). The logic circuit is an electronic circuit which performs a logical operation. Examples of the logic circuit include a large scale integration (LSI) circuit and a field-programming gate array (FPGA). In the above embodiments, the hardware realizes the respective functions of the packet buffering device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

Based on the description of the above embodiments, the present invention may be implemented in the following manner.

(1) A packet discarding method which includes:
a residence time predicting step for predicting a length of time during which an arriving packet will reside in a queue; and
a packet discarding step for discarding the arriving packet when the length of time predicted in the residence time predicting step exceeds a predetermined first reference value. (FIG. 7)

(2) The packet discarding method described in (1), wherein in the packet discarding step, the rate at which to discard the arriving packet is varied in accordance with an amount by which the predicted length of time exceeds the first reference value. (FIG. 8)

(3) The packet discarding method described in (1), wherein when the length of time predicted for the arriving packet exceeds the first reference value, a source of the arriving packet is notified of occurrence of congestion.

What is claimed is:

1. A packet buffering device comprising:
a memory configured for queuing an arriving packet temporarily; and
a processor configured for:
measuring a queue length which indicates an amount of packet data held in the memory;
measuring an output rate at which packets are output from the memory, the output rate changing in time;
predicting, before queuing the arriving packet in said memory, a length of time during which the arriving packet resides in the memory based on a value obtained by dividing the queue length measured by the output rate measured;
measuring a residence time of each packet residing in said memory, and
discarding the arriving packet before queuing the arriving packet in said memory when the length of time predicted exceeds a first reference value, but when the residence time measured is less than a second reference value, said processor does not discard the packet even if the predicted length of time exceeds the first reference value.

2. A packet buffering device as claimed in claim 1, wherein said processor is further configured for discarding said arriving packet at a rate that varies in accordance with an amount by which the length of time predicted exceeds the first reference value.

3. A packet buffering device as claimed in claim 1, wherein said processor is further configured for notifying a source of the arriving packet of occurrence of congestion when the length of time predicted exceeds said first reference value.

4. A packet buffering device as claimed in claim 1, wherein in the measuring of the output rate, said processor measures an amount of packets output from said memory within a period of time, and measures the output rate based on the period and on the amount of packets output during each time interval of the period.

5. A packet buffering device as claimed in claim 1, wherein in the measuring of the output rate, said processor measures a cumulative amount of packets written to said memory when writing a packet to said memory, and measures the output rate based on a difference between the cumulative amount of packets measured at a time of previous writing and the cumulative amount of packets measured at the time of current writing and on a time interval between the time of previous writing and the time of current writing.

6. A packet buffering device as claimed in claim 1, wherein in the measuring of the output rate, said processor measures a cumulative amount of packets read out of said memory when reading a packet from said memory, and measures the output rate based on a difference between the cumulative amount of packets measured at a time of previous reading and the cumulative amount of packets measured at the time of current reading and on a time interval between the time of previous reading and the time of current reading.

7. A packet buffering device as claimed in claim 1, wherein in the measuring of the output rate, said processor outputs as the output rate a weighted average value taken over successively measured output rates.

8. A packet buffering device as claimed in claim 1, wherein in the measuring of the queue length, said processor outputs as said queue length a weighted average value taken over successively measured queue lengths.

9. A packet buffering device, comprising:
a memory configured for queuing an arriving packet temporarily; and
a processor configured for:
measuring a queue length which indicates an amount of data held in said memory;
storing the queue length measured at a time of packet arrival in said memory;
measuring a residence time of each packet residing in said memory;
predicting, before queuing the arriving packet in said memory, a length of time during which the arriving packet resides in said memory based on a value obtained by multiplying a rate of change of the queue length from the time of packet arrival to a current point in time by the residence time measured at the current point in time;
measuring a residence time of each packet residing in said memory, and
discarding the arriving packet before queuing the arriving packet in said memory when the predicted length of time exceeds a first reference value, but when the residence time measured is less than a second reference value, said processor does not discard the packet even if the predicted length of time exceeds the first reference value.

10. A packet discarding method comprising:
measuring a queue length which indicates an amount of packet data held in a memory;
measuring an output rate at which packets are output from the memory, the output rate changing with time;
predicting, before queuing the arriving packet in the memory, a length of time during which an arriving packet resides in the memory based on a value obtained by dividing the queue length measured by the output rate measured;
measuring a residence time of each packet residing in said memory, and
discarding the arriving packet before queuing the arriving packet in the memory when the length of time predicted exceeds a reference value, but when the residence time measured is less than a second reference value, said processor does not discard the packet even if the predicted length of time exceeds the first reference value.

11. A packet discarding method as claimed in claim 10, wherein when the length of time predicted for the arriving packet exceeds the reference value, a source of the arriving packet is notified of occurrence of congestion.

* * * * *